United States Patent
Schrimpsher et al.

(10) Patent No.: US 12,034,593 B1
(45) Date of Patent: Jul. 9, 2024

(54) SYSTEMS AND METHODS FOR ADVANCED CORE NETWORK CONTROLS

(71) Applicant: Cable Television Laboratories, Inc, Louisville, CO (US)

(72) Inventors: Dan Schrimpsher, Huntsville, AL (US); Randy Levensalor, Boulder, CO (US); Michael J. Glenn, Golden, CO (US); Mark Bridges, Brooks, GA (US); Steven J. Goeringer, Westminster, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 38 days.

(21) Appl. No.: 17/060,921

(22) Filed: Oct. 1, 2020

Related U.S. Application Data

(63) Continuation-in-part of application No. 16/507,893, filed on Jul. 10, 2019.

(60) Provisional application No. 62/908,650, filed on Oct. 1, 2019, provisional application No. 62/853,491, filed on May 28, 2019, provisional application No. 62/795,852, filed on Jan. 23, 2019, provisional application No. 62/788,283, filed on Jan. 4, 2019, provisional application No. 62/695,912, filed on Jul. 10, 2018.

(51) Int. Cl.
| | |
|---|---|
| *H04L 12/28* | (2006.01) |
| *H04L 12/46* | (2006.01) |
| *H04L 41/046* | (2022.01) |
| *H04L 41/0816* | (2022.01) |
| *H04L 41/0853* | (2022.01) |
| *H04L 41/147* | (2022.01) |
| *H04L 45/00* | (2022.01) |
| *H04L 45/64* | (2022.01) |
| *H04L 45/74* | (2022.01) |

(52) U.S. Cl.
CPC ........ *H04L 41/0816* (2013.01); *H04L 41/046* (2013.01); *H04L 41/0853* (2013.01); *H04L 41/147* (2013.01); *H04L 45/566* (2013.01); *H04L 45/64* (2013.01); *H04L 45/74* (2013.01)

(58) Field of Classification Search
None
See application file for complete search history.

(56) References Cited

U.S. PATENT DOCUMENTS 8,072,976 B2 * 12/2011 Bennett ................. H04L 63/145
370/389
2003/0202520 A1 * 10/2003 Witkowski .......... H04L 49/3081
370/398

(Continued)

*Primary Examiner* — Nicholas R Taylor
*Assistant Examiner* — Ho T Shiu
(74) *Attorney, Agent, or Firm* — Josh C. Snider; Snider IP

(57) ABSTRACT

A system for managing a core network is provided. The system includes a first computing device including at least one processor in communication with at least one memory device. The first computing device is in communication with a core network. The at least one memory device stores a plurality of instructions, which when executed by the at least one processor cause the at least one processor to store a plurality of historical data associated with the core network, receive current state data from the core network, compare the plurality of historical data with the current state data to determine at least one future state of the core network, and adjust the operation of the core network based on the at least one future state.

24 Claims, 12 Drawing Sheets

(56) References Cited

U.S. PATENT DOCUMENTS

| | | |
|---|---|---|
| 2004/0148391 A1 | 7/2004 | Lake et al. |
| 2007/0211647 A1 | 9/2007 | Hao et al. |
| 2008/0043716 A1 | 2/2008 | Toombs et al. |
| 2009/0109847 A1 | 4/2009 | Stephenson et al. |
| 2009/0177404 A1 | 7/2009 | Hartmann et al. |
| 2010/0180048 A1 | 7/2010 | Guo et al. |
| 2011/0197274 A1* | 8/2011 | Callon ................ H04L 63/1425 726/22 |
| 2011/0231551 A1 | 9/2011 | Hassan et al. |
| 2012/0157106 A1 | 6/2012 | Wang et al. |
| 2017/0052821 A1 | 2/2017 | Wu et al. |
| 2017/0272465 A1 | 9/2017 | Steele |
| 2018/0123705 A1 | 5/2018 | Henry et al. |
| 2018/0131617 A1* | 5/2018 | Hira ........................ H04L 45/74 |
| 2018/0191619 A1 | 7/2018 | Karthikeyan et al. |
| 2018/0288091 A1 | 10/2018 | Doron et al. |
| 2018/0359184 A1 | 12/2018 | Inbaraj et al. |
| 2018/0359811 A1* | 12/2018 | Verzun .................. H04W 88/16 |
| 2018/0367412 A1 | 12/2018 | Sethi et al. |
| 2019/0014394 A1 | 1/2019 | Anand et al. |
| 2019/0068693 A1 | 2/2019 | Bernat |
| 2019/0132206 A1 | 5/2019 | Hanes et al. |
| 2019/0140976 A1 | 5/2019 | Liou et al. |
| 2019/0190804 A1 | 6/2019 | Tang et al. |
| 2020/0021490 A1 | 1/2020 | Schrimpsher et al. |
| 2021/0126854 A1* | 4/2021 | Guo ...................... H04L 41/145 |

\* cited by examiner

SYSTEMS AND METHODS FOR ADVANCED CORE NETWORK CONTROLS

CROSS REFERENCE TO RELATED APPLICATIONS

This application claims the benefit of and priority to U.S. Provisional Patent Application No. 62/908,650, filed Oct. 1, 2019, entitled "DEVICE TO CORE (D2C)—PROGRAMMABLE DATA PLANE IN ACTION," and also is a continuation-in-part of U.S. patent application Ser. No. 16/507,893, filed Jul. 10, 2019, entitled "SYSTEMS AND METHODS FOR ADVANCED CORE NETWORK CONTROLS," which claims the benefit of and priority to U.S. Provisional Patent Application No. 62/695,912, filed Jul. 10, 2018, entitled "OPEN INTENT NETWORK CONTROL FOR CDN (OINC-CDN)," to U.S. Provisional Patent Application No. 62/853,491, filed May 28, 2019, entitled "DEVICE TO CORE (D2C)—PROGRAMMABLE DATA PLANE IN ACTION," to U.S. Provisional Patent Application No. 62/795,852, filed Jan. 23, 2019, entitled "DEVICE TO CORE (D2C)—PROGRAMMABLE DATA PLANE IN ACTION," and to U.S. Provisional Patent Application No. 62/788,283, filed Jan. 4, 2019, entitled "DEVICE TO CORE (D2C)—PROGRAMMABLE DATA PLANE IN ACTION," the entire contents and disclosures of which are all incorporated by reference herein in their entireties.

BACKGROUND

The field of the disclosure relates generally to network messaging, and more particularly, to systems and methods for dynamically routing messages in a core network.

One challenge presently facing core networks relates to the high-use products such as content delivery networks (CDN). CDNs use a very large share of bandwidth of the core networks, and this bandwidth consumption by CDNs creates a number of problems in the operation of the core network. One such problem is known as overspending. Overspending may occur in the case where a significant difference exists between peak traffic and nominal traffic, and/or a significant difference between the upstream and downstream traffic. In such cases, the network provider will often overspend on equipment licenses, namely, paying for both upstream and downstream links for an entire day of traffic, when in actuality, one of the upstream/downstream links is only needed during peak CDN traffic.

Additionally, traffic optimization is becomes more difficult in the case where the core network covers multiple time zones, that is, where the peak CDN traffic tends to occurs in different locations at different times. The failure to sufficiently optimize the traffic often leads to poor service conditions for end users attempting to access the CDNs. Moreover, many such optimization schemes are performed manually, and are extremely costly and difficult to perform on a consistent basis, due to the fact that many of the links are thousands of kilometers apart.

Furthermore, conventional software defined network (SDN) controllers are known to only provide an abstraction layer for infrastructure access, which functions by hiding details and optimizing its control plane. Nevertheless, despite the fact that the SDN controllers ease user access, implementation of the SDN controllers still require regular user input.

Additionally, another challenge facing CDNs involves cybersecurity and efficiency issues related to fixed packet processing, and more particularly, from packets originating from an end user's network. The core networks have limited visibility into packets that originate from the end user's network, which significantly limits the network operator's ability to identify, mitigate, and optimize the network in real-time, or near real-time, in response to network events and conditions. This challenge further limits the operator's ability to dynamically update the data plane without expensive firmware and/or silicon-based upgrades. Conventional sampling methods still further limit the ability of the system to properly model and dynamically optimize the core network.

Distributed denial of service (DDoS) attacks and other cyberattacks cost operators billions of dollars, and the impact of these attacks continues to grow in size and scale, with some exceeding 1 Tbps. Detecting attacks is difficult, but mitigating them is even harder, and a number of solutions have been proposed with varying degrees of success. Typically, these solutions focus on the target of the attack rather than the source. However, even if the target is completely protected, an operator's access networks can still be seriously affected, resulting in connectivity loss and quality of service (QoS) issues for customers.

SUMMARY

In an embodiment, a system for managing a core network is provided. The system includes a first computing device including at least one processor in communication with at least one memory device. The first computing device is in communication with a core network. The at least one memory device stores a plurality of instructions, which when executed by the at least one processor cause the at least one processor to store a plurality of historical data associated with the core network, receive current state data from the core network, compare the plurality of historical data with the current state data to determine at least one future state of the core network, and adjust the operation of the core network based on the at least one future state.

In another embodiment, a system for managing a core network is provided. The system includes one or more switches in communication with a plurality of gateways. Each of the plurality of gateways are in communication with one or more user computer devices. The system also includes a router in communication with the one or more switches. The system is programmed to receive, at the one or more switches, a packet from a gateway of the plurality of gateways. The system is also programmed to insert, by the one or more switches, metadata into a header of the packet. The system is further programmed to transmit, from the one or more switches to the router, the packet. In addition, the system is programmed to analyze, by the router, the metadata in the header of the packet. Moreover, the system is programmed to determine, by the router, whether to route the packet to its destination based on the analysis.

In a further embodiment, a system for managing a core network is provided. The system includes one or more switches in communication with a plurality of gateways. Each of the plurality of gateways are in communication with one or more user computer devices. The system also includes a router in communication with the one or more switches. The system is programmed to receive, at the one or more switches, a packet from a gateway of the plurality of gateways. The system is also programmed to insert, by the one or more switches, metadata into an enriched header of the packet. The metadata includes actual routing information for the packet. The system is further programmed to transmit, from the one or more switches to the router, the packet.

In addition, the system is programmed to remove, by the router, the enriched header of the packet. Moreover, the system is programmed to transmit, from the router, the packet to its destination. In addition, the system is programmed to transmit, from the router, the enriched header to an analytics engine.

In a still further embodiment, a method for managing a core network is provided. The method includes receiving, at one or more switches, a packet from a gateway. The method also includes inserting, by the one or more switches, metadata into an enriched header of the packet. The metadata includes actual routing information for the packet. The method further includes transmitting, from the one or more switches to a router, the packet. In addition, the method includes removing, by the router, the enriched header of the packet. Moreover, the method includes transmitting, by the router, the packet to its destination. Furthermore, the method includes transmitting, by the router, the enriched header to an analytics engine.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
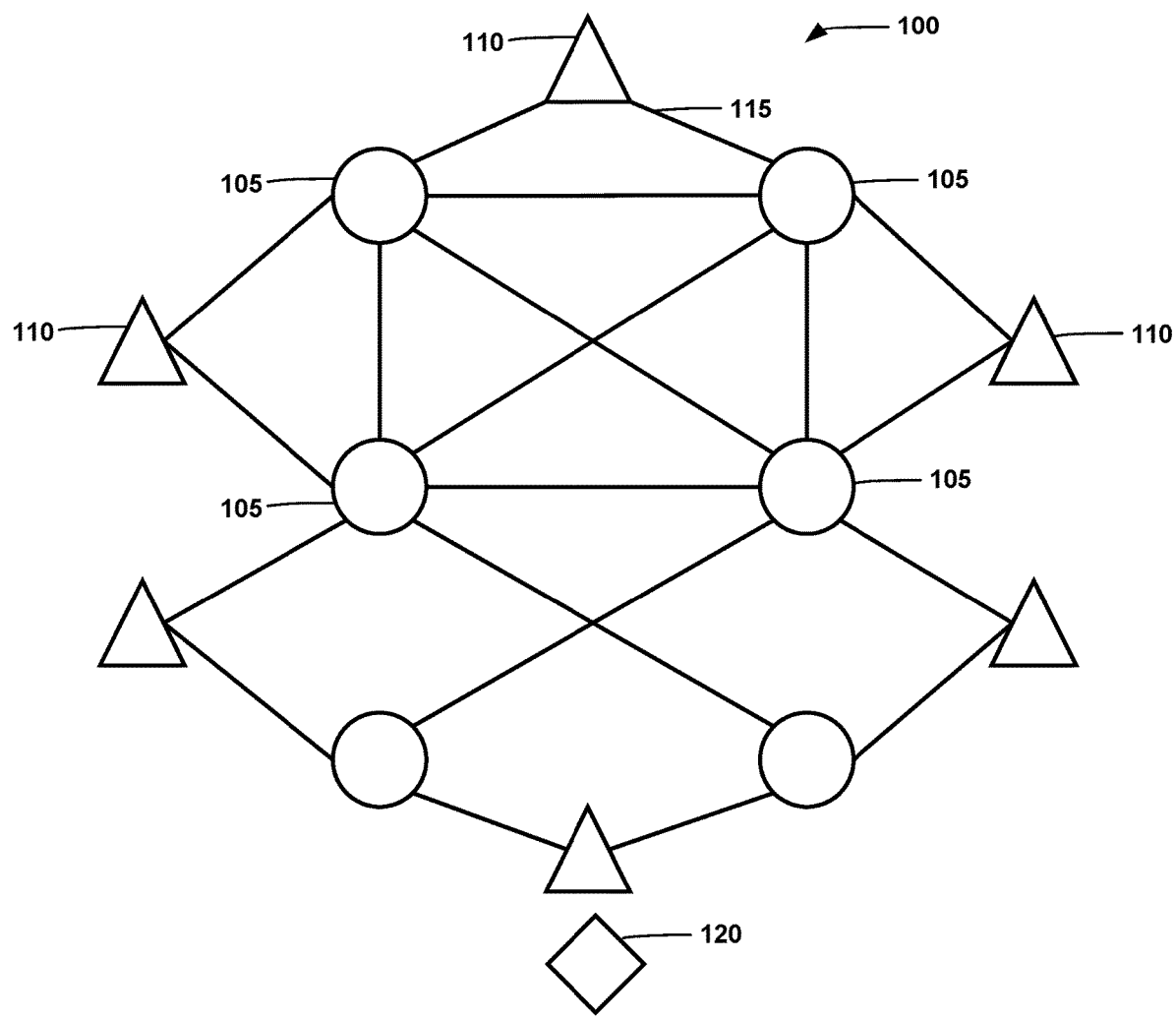
FIG. 1 is a schematic illustration of a core network, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

The embodiments described herein provide innovative systems and methods for monitoring, optimizing flow, and maintaining the security status of a core network. The embodiments described herein further provide systems and methods for monitoring, optimizing flow, and maintaining the security status of a core network. In an exemplary embodiment, an open intent based network controller (OINC) interfaces between the routers and links associated with a service provider to provide content to the end users. In an exemplary embodiment, the OINC serves to function as a protective interface, or "midbox", for monitoring data flows and communications along the network, and for optimizing the network based on the data flows/communications.

As described further herein, the OINC may further dynamically reconfigure the network flows in the core network based on continuous analysis to dynamically recalculate the number of licenses required for the core network, to reduce network based costs without jeopardizing network performance, especially during peak CDN times. In some embodiments, the OINC may be further configured to provide an automated control over the core network (e.g., element 305, described further below) to enable greater flexibility, easier updates, and a more comprehensive understanding of the present state of the operation of the core network. These advantageous aspects of the embodiments thus further enable evolution of the network in accordance with relevant advances in the technology thereof.

In an exemplary embodiment, a system of P4-enabled switches and network interface cards enables improved telemetry and tracking of data as the data is transmitted from the end user. This innovative tracking capability thereby improves the ability of the operator to optimize communications, determine user device types, and analyze the data for potential cybersecurity threats coming from one of more user computer devices. The P4 switches may therefore be considered to advantageously act as the protective interface/midbox that monitors communications between the end user device and the service provider. In some embodiments, the P4 switches may be further configured to monitor for malicious activities on the part of a device, and to protect other devices on the network and the service provider from such activities.

In an exemplary embodiment, leveraging programmable ASICs and the P4 Runtime provides enhanced device visibility and packet processing by making the behavior of the data plane expressible in software and customizable without impacting performance. The present systems and methods may thus be configured to pair a Data Over Cable Service Interface Specification (DOCSIS) modem, enhanced with a P4 Runtime, with a series of P4 enabled devices connecting back to the operator headend to provide visibility throughout the access network. The system may therefore leverage a machine learning based controller trained with patterns to identify conditions and perform a number of dynamic operations by deploying new packet processing behaviors in the network (e.g. DDoS mitigation, virtual firewall, QoS detection/enforcement, DOCSIS data plane functions, etc.). All operations may be performed at line rate, and may further leverage the P4 In-band Network Telemetry (INT) to allow collection and reporting without control plan intervention. In an exemplary embodiment, inserting telemetry into the packet header further enables telemetry on all packets, as opposed to only taking a sample of the packets.

In some embodiments, the data provided may be used for detecting Wi-Fi lag in the end user's network, detecting retransmissions, and providing display device type information to help with rendering devices video for 2D, virtual reality (VR), and light-field displays.

Transparent Security architecture described herein uses a machine-learning controller that has been trained with patterns to identify conditions and to perform dynamic operations by deploying new packet processing behaviors in the network (e.g., DDoS mitigation, virtual firewall, QoS detection/enforcement, and DOCSIS data plane functions). All operations will be performed at line rate while leveraging P4 in-band network telemetry (INT), which allows data to be collected for reporting and analysis without control plane intervention. By inserting telemetry into the packet header, telemetry can be added to all packets rather than simply a sampling, which significantly reduces the time required to identify and mitigate the attack FIG. 1 is a schematic illustration of a core network 100. In an exemplary embodiment, the core network 100 includes a plurality of provider routers 105 and a plurality of provider edge routers 110. In this example, the provider routers 105 and provider edge routers 110 are associated with a core network provider. In some embodiments, the provider routers 105 and provider edge routers 110 may be associated with hardware owned and/or licensed/rented by the core network provider. In an exemplary embodiment, the provider routers 105 and provider edge routers 110 are operably connected with multiprotocol label switching (MPLS) 115 links. The core network may be configured to route content from content delivery networks (CDN) 120 through the provider routers 105 and the provider edge routers 110. In the exemplary embodiment, the traffic associated with the CDN 120 changes over time, where there are peak traffic times, and nominal traffic times. For example, during a peak traffic time, the traffic of the CDN 120 may constitute approximately 75% of the total traffic on the network.

In an exemplary embodiment, the core network 100 is configured with backup provider routers 105 such that, if one provider router 105 or MPLS link 115 fails, then the core network 100 may route traffic to backup provider routers 105 through backup MPLS links 115. In an embodiment, the respective routes taken by different traffic are optimized to prevent significant delays, and to better ensure that the respective content arrives in the most efficient manner/path.

Figure 2:
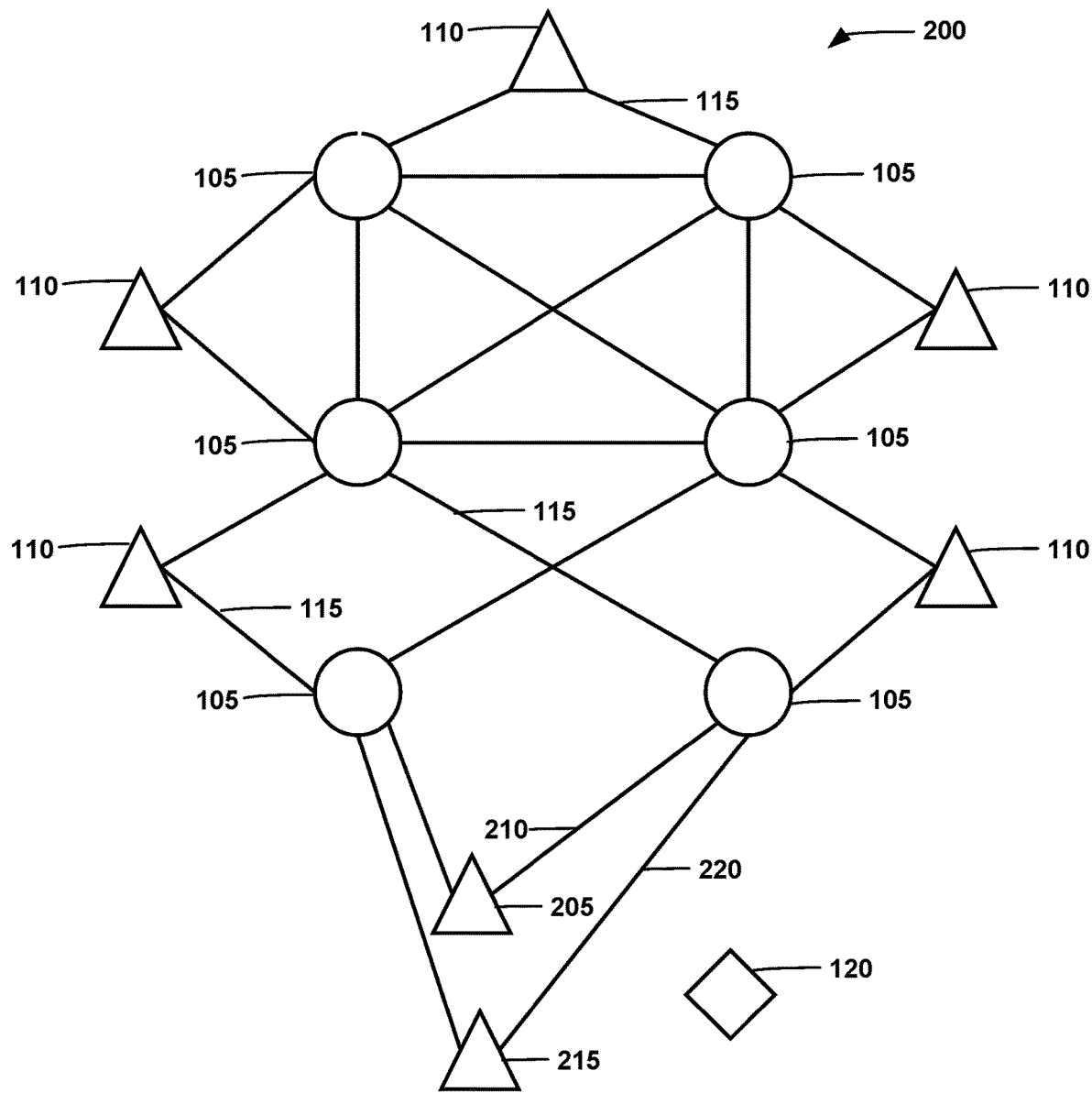
FIG. 2 is a schematic illustration of a core network, according to an embodiment.

FIG. 2 is a schematic illustration of a core network 200. In an exemplary embodiment, and similar to core network 100, FIG. 1, the core network 200 includes a plurality of provider routers 105 and a plurality of provider edge routers 110, and the provider routers 105 and the provider edge routers 110 are associated with a core network provider in this example as well. Accordingly, elements labeled by one number in one drawing may be considered herein to have a substantially similar structure and/or function where designated by the same label or number in another drawing. In an exemplary embodiment, the provider routers 105 and the provider edge routers 110 are further operably connected with multiprotocol label switching (MPLS) 115 links.

In an exemplary embodiment, the core network 200 is configured to route content from the CDN 120 through the provider routers 105 and the provider edge routers 110. Similar to the core network 100, FIG. 1, the traffic associated with CDN 120 changes over time, where there are peak traffic times and nominal traffic times. Different though, from the core network 100, FIG. 1, in an exemplary embodiment, the core network 200 further includes a first router 205 connected by a first link 210, and a second router 215 connected by a second link 220. In this example, the first link 210 has a bandwidth of 1 Tbps, and the second link 220 has a bandwidth of 550 Gbps. In an embodiment, each one of the first link 210 and the second link 220 are licensed to the network provider.

In one example of operation, the first link 210 may be considered to normally use 450 Gbps of bandwidth. However, during peak CDN traffic, the first link uses 750 Gbps of bandwidth in this example. Thus, to save on costs of licenses, the core network 200 may shut off the data flow on the second link 220 and reroute that data onto the unused bandwidth of the first link 210. However, when the CDN peak hits, the core network 200 reactivates the second link 220. In some embodiments, the core network 200 may then be configured to reactivate the second link 220 quickly to avoid delaying content to the end users.

Figure 3:
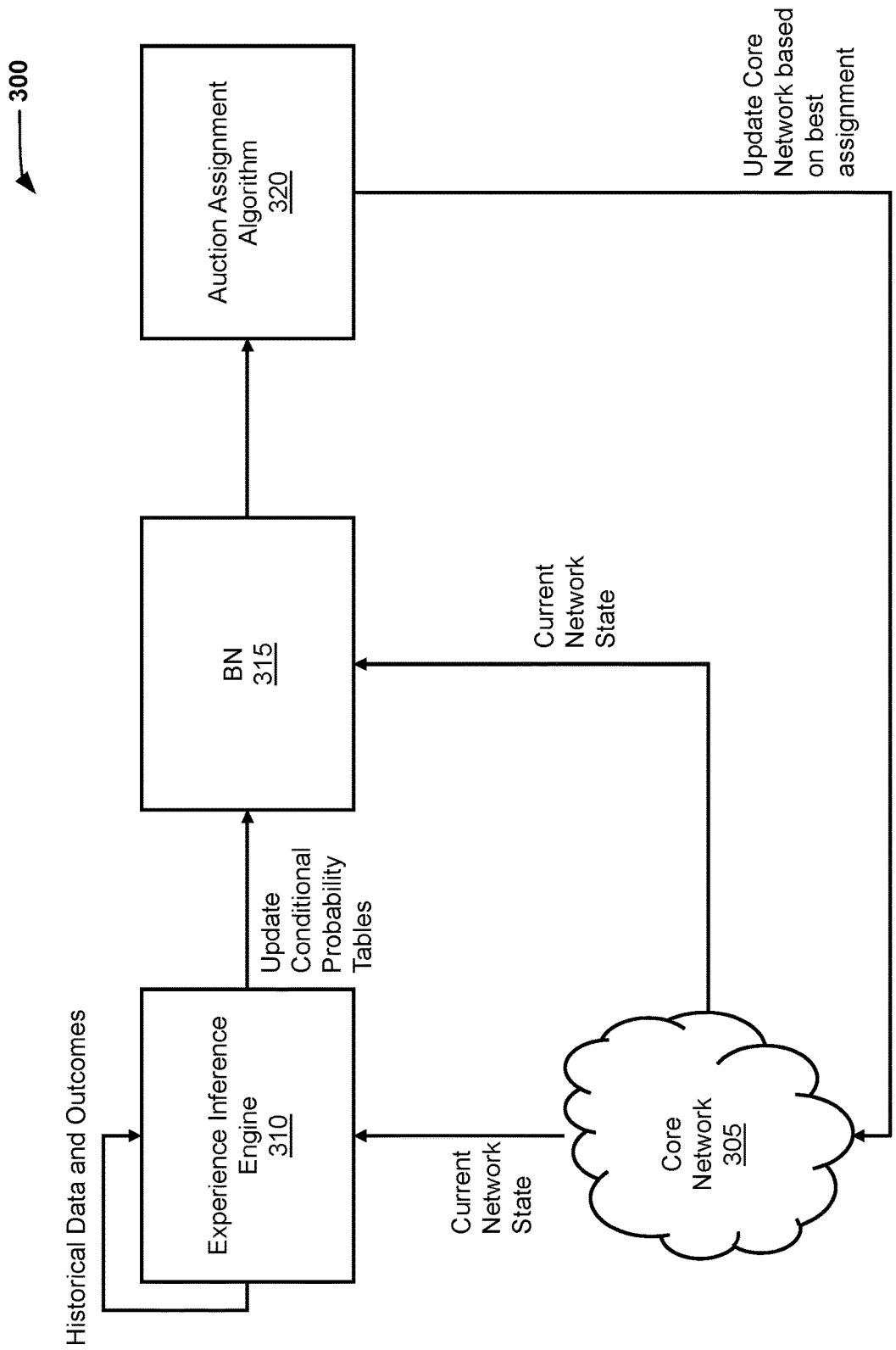
FIG. 3 is a schematic illustration of a system for monitoring and optimizing the core networks depicted in FIGS. 1 and 2 in response to bandwidth created by content delivery networks.

FIG. 3 is a schematic illustration of a system 300 for monitoring and optimizing the core networks 100 and 200 (shown in FIGS. 1 and 2, respectively) in response to bandwidth created by CDN 120. In an exemplary embodiment, the system 300 may either include, or be in communication with, a core network 305. In an embodiment, the core network 305 is similar to the core network 100, FIG. 1, and the core network 200, FIG. 2.

In an exemplary embodiment, the system 300 includes an experience inference engine (EIE) 310, a Bayesian network (BN) 315, and an auction assignment algorithm (AAA) 320. The EIE 310 is configured to integrate data, information, and knowledge and generate analysis based on expertise, such as through machine learning and network modeling. The BN 315 generates a model for predicting traffic on a hop by hop basis. The AAA 320 calculates the minimum cost flow auction assignment for data traffic.

In some embodiments, the system 300 is an open intent based network controller (OINC) 300. The OINC 300 may be configured to have a full view of the core network 305, similar to a software defined network (SDN). In at least one embodiment, the OINC 300 is further configured or programmed to not only change the routing rules, but also to (i) predict changes in traffic, and (ii) dynamically change the configuration of the core network 305.

In an exemplary embodiment, the core network 305 provides data about the current network state to the EIE 310 and the BN 315. The EIE 310 integrates that data based on date, time, location, traffic type, and other factors. The data may be also integrated with previously collected and analyzed data about the core network 305 as well as with the current network topology. The EIE 305 may thus combine the current data, the historical data, and the previous network state to generate probabilities or likelihoods for the future state of the network 305. In some embodiments, the EIE 305 generates a network Kalman filter.

In an embodiment, the EIE 305 provides the probabilities to the BN 315. The BN 315 combines the previously calculated probabilities, with the new probabilities and the data from the core network 305 to predict a cost for each of the probabilities. The BN 315 may then use the AAA 320 to analyze the core network 305 for the optimal choices of how to update the core network 305 for the next period of time. The OINC 300 may then update the core network 305. In some embodiments, the OINC 300 may update the network in real-time or near real-time (i.e., seconds). In other embodiments, the OINC 300 executes a longer running decision process. For example, the EIE 310 may read in-state data for a long period of time before triggering the BN 310 by providing the updated probabilities. In another example, the OINC 300 may only update the core network 300 on a weekly or monthly basis.

One potential problem with optimizing network flow is the time performance of simulating the complex set of variables that go into a large core network 305. To overcome this issue, the EIE 310 may be programmed to use various manifolds to reduce the dimensionality of the network flows to reduce the required computational time. Furthermore, the EIE 310 may use machine learning to determine which variables and data is superfluous and focus on the real interactions within the network, thus reducing required computational time.

In some embodiments, the OINC 300 makes use of a core traffic matrix to determine an optimal graph from financial costs (money) and technical costs (delay, jitter, packet loss) point of view.

In an embodiment, the OINC 300 dynamically reconfigures the network flows in the core network 305 based on continuous analysis to dynamically recalculate the number of licenses required for the core network 305 to reduce network based costs without jeopardizing network performance, especially during peak CDN times. Furthermore, the OINC 300 may also provide an automated control over the core network 305 to allow greater flexibility, easier updates, and an improved understanding of the present state of the operation of the core network 305, thereby allowing for the evolution of the network as the relevant technology continues to advance.

While the OINC 300 system is described in some of the embodiments herein in relation to core networks 305, the OINC 300 may also, or alternatively, be implemented with respect to data centers and large private local area networks and wide area networks.

Figure 4:
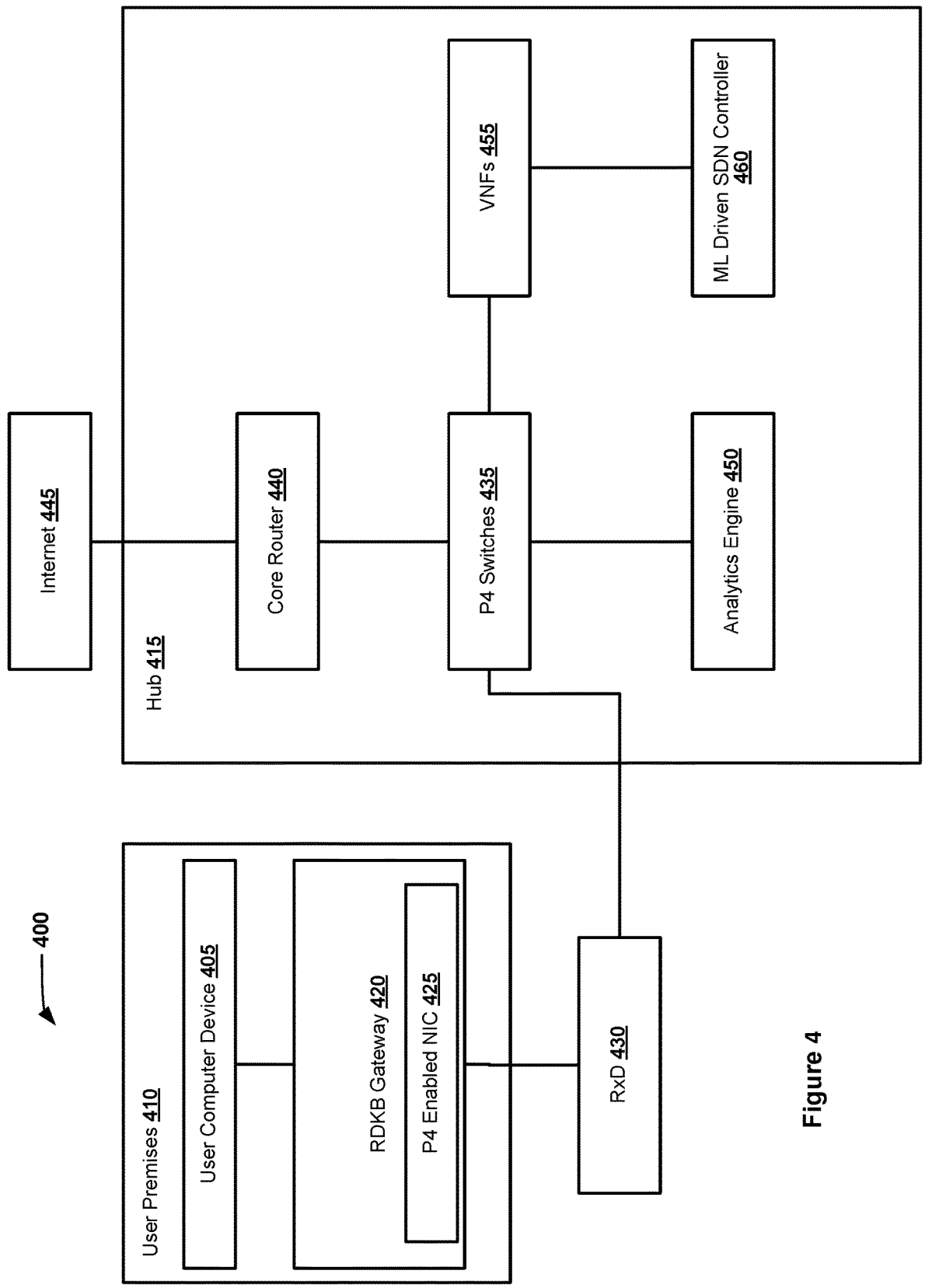
FIG. 4 is a schematic illustration of a system for monitoring and optimizing core networks in response to communications from end user computer devices.

FIG. 4 is a schematic illustration of a system 400 for monitoring and optimizing core networks in response to communications from end user computer devices. In an exemplary embodiment, system 400 is configured for monitoring communications from user computer devices 405 on a user premises 410 to a hub 415. User computer devices 405 may, for example include without limitation a desktop computer, a laptop computer, a personal digital assistant (PDA), a cellular phone, a smartphone, a tablet, a phablet, wearable electronics, smart watch, an IP camera, and/or other web-based connectable equipment or mobile devices.

In the exemplary embodiment, the user computer devices 405 are connected to reference design kit B (RDKB) gateway 420, such as over a wired connection (e.g., Ethernet), a wireless connection (e.g., Wi-Fi), or an Internet of Things (IoT)-type connection. In some embodiments, the gateway 420 is a modem, or a cable modem. In other embodiments, the gateway 420 is another type of device that enables the system 400 to operate as described herein. In some embodiments, user computer devices 405 are visible to the hub 415.

In other embodiments, the user computer devices 405 are hidden from the hub 415, such as behind the gateway 420.

In an exemplary embodiment, the RDKB gateway 420 includes a P4-enabled network interface card (NIC) 425. For the purposes of this discussion, "P4" stands for "Programming Protocol-Independent Packet Processors," and refers to the programming language designed to allow the programming of packet forwarding planes. The P4-enabled NIC 425 allows for additional data (e.g., metadata) to be added to the headers of the data being transmitting from the RDKB gateway 420 to allow for improved telemetry as described herein.

The RDKB gateway 420 may thus be configured to route data from the user computer devices 405 to the RxD 430 associated with the hub 415. The data may then be routed to P4 switches 435, which may include or be configurable switches that enable dynamic routing of messages. In an exemplary embodiment, the P4 switches 435 are configured to provide an enhanced platform to support micronets, DDos identification/mitigation, blocking infected cable modems, full packet capture, network traffic characterization, and crypto evolution.

In an embodiment, the hub 415 includes one or more core routers 440 that route data between the end user's gateway 420 and the Internet 445. The hub 415 may further include one or more virtual network functions (VNFs) 455 or physical network functions, including without limitation virtual cable modem termination systems (vCMTS), virtual firewire (vFW), domain name servers (DNS), and "honeypots."

In an embodiment, the hub 415 may further include a machine learning (ML) driven software defined network (SDN) controller 460. The ML driven SDN controller 460 may be configured to combine intelligent traffic analysis with the P4 enabled device controller (e.g., NIC 425). The ML driven SDN controller 460 may be further configured to determine which rules to implement based on dynamic network traffic, and to update the P4 enabled switches 435, RDKB gateways 420, and core routers 440. In some embodiments, the ML driven SDN controller 460 includes network optimization engines, connections to operator systems, connections to consumer systems, cloud based meta-analytics for overall Internet traffic, and another other components required for specific use cases. In some embodiments, the P4 enabled switches 435, RDKB gateways 420, and core routers 440 can performed by virtual network functions.

In an embodiment, the hub 415 may further include an analytics engine 450. The analytics engine 450 is configured to serve as the intelligent core of the programmable data plane. The purpose of the analytics engine 450 is to analyze a stream of packets that include P4 enhanced data, and to make inferences relative to generally defined patterns, which patterns represent the goals of the system 400, such as DDos mitigation or QoS. When a pattern is matched, the analytics engine 450 may be further configured to notify the SDN controller that is responsible for implementing network changes through the control plane. The goals of the analytics engine 450 may then utilize enriched packet headers to (i) detect and identify network conditions and devices, (ii) match streams of packets to goal patterns, and/or (iii) provide near real-time decision making.

In the case of programmable data plane configurations, the ML driven SDN controller 460 need not be reactive, but rather proactive. That is, the information used by the analytics engine 450 may be captured by the P4 switches 435 as part of the data plane, and then forwarded to the analytics engine 450 in-line with the network traffic. The ML driven SDN controller 460 may then update action tables in the P4 switches 435 through the control plane management interface when notified by the analytics engine 450 that a network goal has been detected. Accordingly the goals of the ML driven SDN controller 460 may advantageously be implemented to (i) allow for minimally intrusive network control, (ii) deploy new packet processing code to mitigate events or enhance processing, and (iii) act on potentially complex events that involve multiple end user devices 405, gateways 420, switches 435, and routers 440.

In exemplary embodiments, some or all of gateway 420, switches 435, and core router 440 may be P4 enabled. That is, the more of these respective elements that are so enabled, the more robust will be the data that is available. In an exemplary embodiment, at each P4 enabled device, in-band network telemetry (INT) data may be added to the packet in-line. This INT data may accordingly be used to identify the original source of the traffic regardless of network address translation (NATing), bridging, or other methods of hiding origin. Examples of relevant INT data are shown below in Table 1.

TABLE 1

| FIELD | DESCRIPTION | PURPOSE |
| --- | --- | --- |
| Source MAC | Record of the MAC address of the original source of the packet | Identify actual source |
| Source IP | Record the IP address of the original source of the packet | Identify actual source |
| Core Router ID | Record the core router 440 that the packet went through | Identify actual source |
| Gateway ID | Record the gateway 420 that the packet went through | Identify actual source/Identify infected gateway |
| Switch ID | Record the aggregate switch 435 that the packet went through | Follow the traffic pattern of the packet |
| Data Length | Size in bytes of the packet's payload | Pattern matching |

In an embodiment, the analytics engine 450 uses the INT data to find patterns in the traffic, and may further organize the data by source, traffic patterns, customer, and/or other data. When the analytics engine 450 discovers a pattern, a rule may then be activate, and the ML driven SDN controller 460 may update any or all of the P4 enabled devices to implement the new rule in-line in the data plane.

In an embodiment, at each P4 enabled device, telemetry data may be requested by or periodically reported to the ML driven SDN controller 460. For example, in a DDoS use case, the number of packets forwarded to the next stage in the network and the number of packets may be blocked due to the DDos rule ordered by the previous device/gateway/switch. According to the present embodiments though, the relevant information may be aggregated and reported to an operator or customer to repair infected devices and/or for future analysis.

In some embodiments, for each P4 enabled device, rules are applied to a table. These applied rules may then be created, updated, or removed during runtime, thereby advantageously enabling the relevant device to adapt to the current network conditions.

Figure 5:
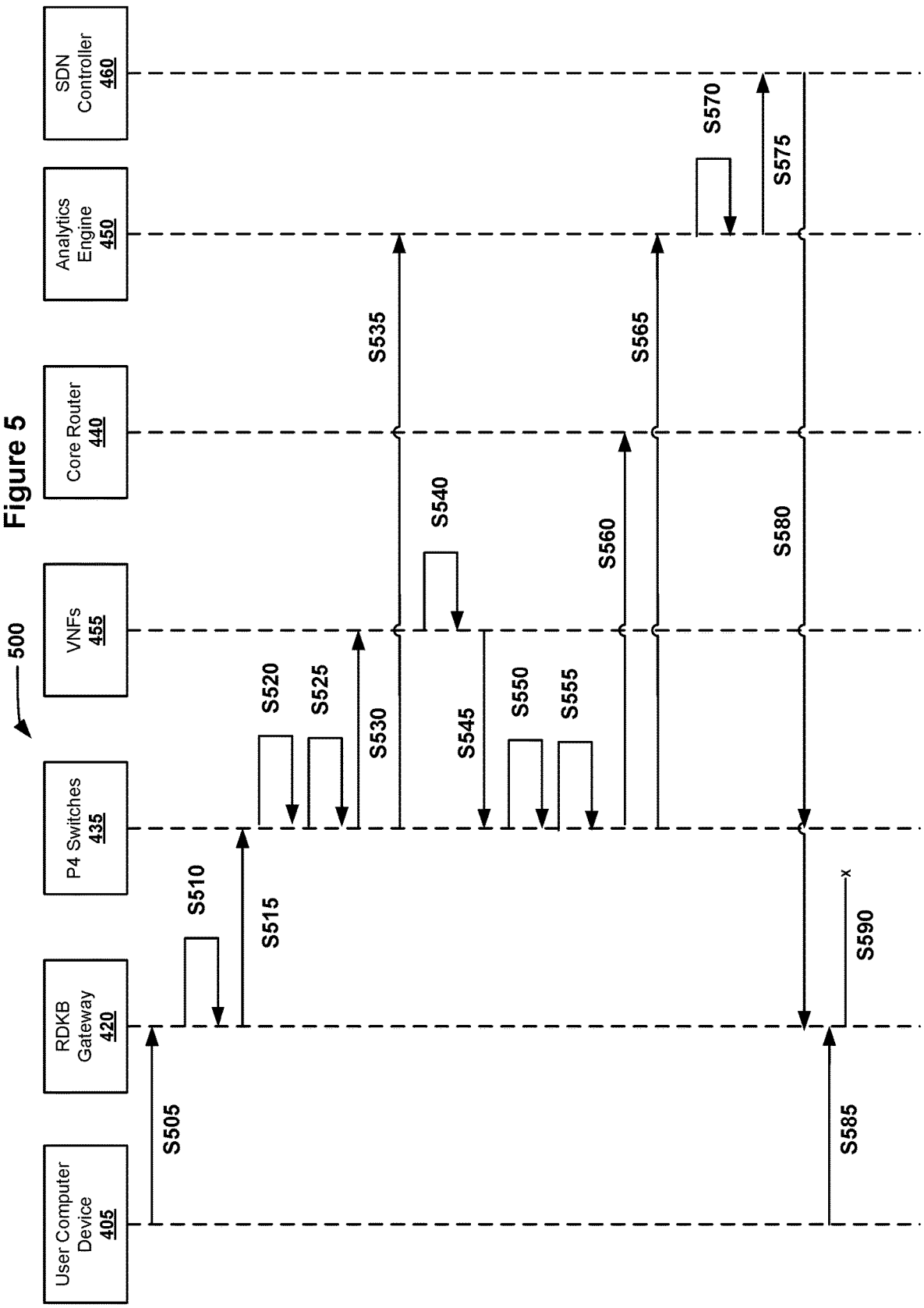
FIG. 5 is a data flow diagram of a process for monitoring the communications originating from an end user network using the system depicted in FIG. 4.

FIG. 5 is a data flow diagram of a process 500 for monitoring the communications originating from an end user network and responding using system 400, FIG. 4. In the exemplary embodiment, process 500 begins at step S505, in which the user computer device 405 transmits a packet to the gateway 420. In step S510, the gateway 420 inserts P4.INT data into the packet. In step S515, the gateway 420 then transmits the packet to the switches 435. In step S520, the switches 435 evaluate the P4.INT data. If, in step S520, the P4.INT data does not trigger an action, process 500 proceeds to step S525, in which the switches 435 insert additional P4.INT data.

In step S530, the switches 435 then transmit the packet to the VNFs 455. In step S535, the switches 435 also transmit the either the packet or the metadata associated with the packet to the analytics engine 450. In step S540, NICs on servers associated with the VNFs 455 may then insert additional P4.INT data to the packet. In step S545, the VNFs 455 transmit the packet back to the switches 435. In step S550, the switches 435 evaluate the P4.INT data. If, in step S550, the P4.INT data does not trigger an action, process 500 proceeds to step S555, in which the switches 435 insert additional P4.INT data.

In step S560, the switches 435 then transmit the packet to the core router 440. In step S565, the switches 435 may further transmit to the analytics engine 450 one or more of the packet or the metadata associated with the packet. In an exemplary embodiment of steps S560 and S565, the core router 440 may be further configured to transmit the packet to the Internet 445 (see, e.g., FIG. 4 and accompanying description), and the core router 440 may thus be P4 enabled and configured to evaluate the P4.INT data. If the P4.INT data does not trigger an action, the core router may insert additional P4.INT data and transmit the inserted data to the Internet 445. In other embodiments, the core router 440 removes the P4.INT data before transmitting the packet to the Internet 445 or a final destination.

In step S570, the analytics engine 450 analyzes the packets and/or metadata to determine the source of the DDoS attack or other infection. In step S575, the analytics engine 450 requests that the SDN controller 460 mitigate the DDoS attack. In step S580, the SDN controller 460 provides instructions to all (or at least some) of the P4 enabled devices to mitigate the DDoS attack. In an exemplary embodiment of step S580, the SDN controller 460 further instructs the P4 enabled devices to drop any packet matching the source (e.g., IP address or MAC address) and packet type identified as being a part of the DDoS attack.

In step S585, another packet is transmitted from the user computer device 405. In step S590, the gateway 420 drops the packet. In an exemplary embodiment of step S590, if the gateway 420 is the source of the attack or is not P4 enabled, then process 500 may instruct the switches 435 to drop the packet.

In some embodiments, the system 400 identifies the attacking device using some combination of the MAC address, the gateway, and the local IP address. However, because MAC and IP addresses may be spoofed during an attack, the system 400 may be further configured to notify the end user that the end user device has been compromised and may be participating in a DDoS attack. Such notification may be performed, for example, using a generated list, stored within the system 400, of known devices associated with each end user. This list may be generated, for example, by the analytics engine 450, which may itself narrow down the device type behind the attack by looking for common types of devices in the customer premises (e.g., element 410, FIG. 4) participating in a specific attack.

The present embodiments may thus advantageously employ multiple techniques to identify the types of devices 405 on end user premises 410: (i) the end users may specify which devices 405 they own and have connected to the gateway 420, such as through a web portal; (ii) for devices 405 with web browser, end users may go to a webpage that automatically records the device type; (iii) end users may install an application on their devices 405 to share their device type; (iv) MAC addresses provide some information about the manufacture of the network adapter; (v) the gateway 420 may be configured to probe the device 405 to identify it, such as by analyzing which ports are open and the information that can be viewed therefrom; (vi), the analytics engine 450 may look at flows and identify patters for different device types; and/or (vii) the analytics engine 450 may analyze the protocols and encryption used in flows for the device 405 to narrow down the types of devices.

Figure 6:
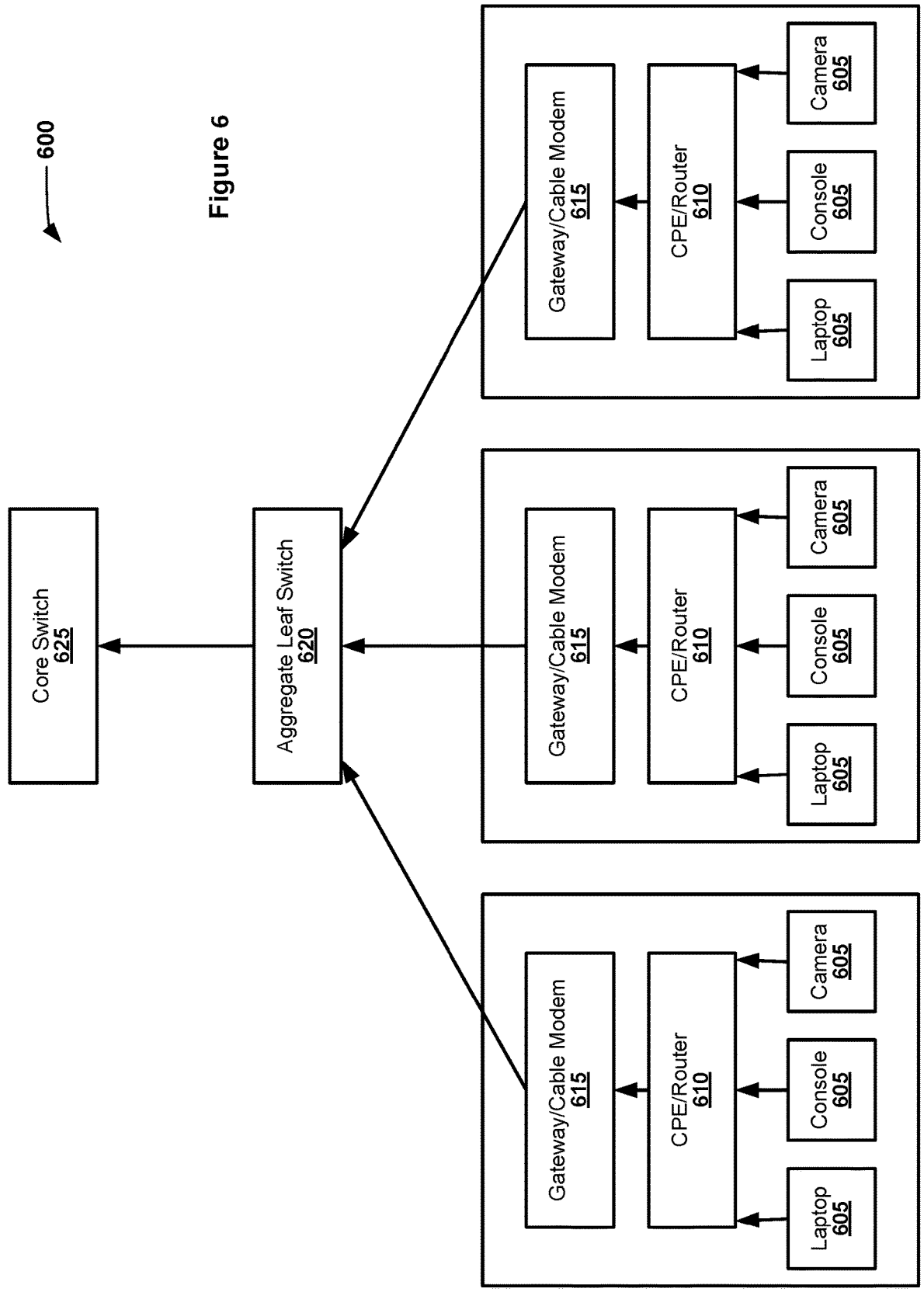
FIG. 6 is a schematic illustration of data plane architecture in accordance with the system depicted in FIG. 4.

FIG. 6 is a schematic illustration of a data plane architecture 600 in accordance with the system 400, FIG. 4. In the exemplary embodiment depicted in FIG. 6, the data plane architecture 600 is configured to service a plurality of devices 605, such as laptops, consoles, and cameras, associated with a plurality of end users. In this example, each device 605 may be connected with a CPE/Router 610 on the user premises. The individual CPEs/Routers 610 may then operably connect to a respective gateway/modem 615. In some embodiments, the CPE/Router 610 and the gateway/modem 615 are integrated into the same device. In other embodiments, the CPE/Router 610 and the gateway/modem 615 are separate devices, which may be remotely located from one another. The gateway 615 connects the devices 605 to the core network through an aggregate leaf switch 620, and the aggregate leaf switch 620 connects to a core switch 625.

In the exemplary embodiment, the aggregate leaf switch 620 and the core switch 625 are P4-enabled. In some embodiments, one or more additional devices may be disposed between the P4 enabled switches, including without limitation an Optical Communications Module Link Extender (OCML), a DPA, and a modem termination system (MTS) or a cable MTS (CMTS).

In the exemplary embodiment, different combinations of the CPE/Router 610, gateway 615, aggregate switches 620, and core switches 625 may be P4-enabled. As more of the devices are P4-enabled, more use cases and analyses are available. In an embodiment, the architecture of the present systems and methods may be implemented in stages, such that the "left-side" gateway 615 and the aggregate switch 620 are P4-enabled, thereby enabling improved monitoring of the devices 605 from the "left-side" end user premises. Thus, as time and costs allow, other gateways 615 may later be P4-enabled according to the present techniques.

In some embodiments, device 605 is similar to user computer device 405, FIG. 4, gateway 615 is similar to gateway 420, FIG. 4, and aggregate leaf switch 620 and core switch 625 are respectively similar to switches 435, FIG. 4.

Figure 7:
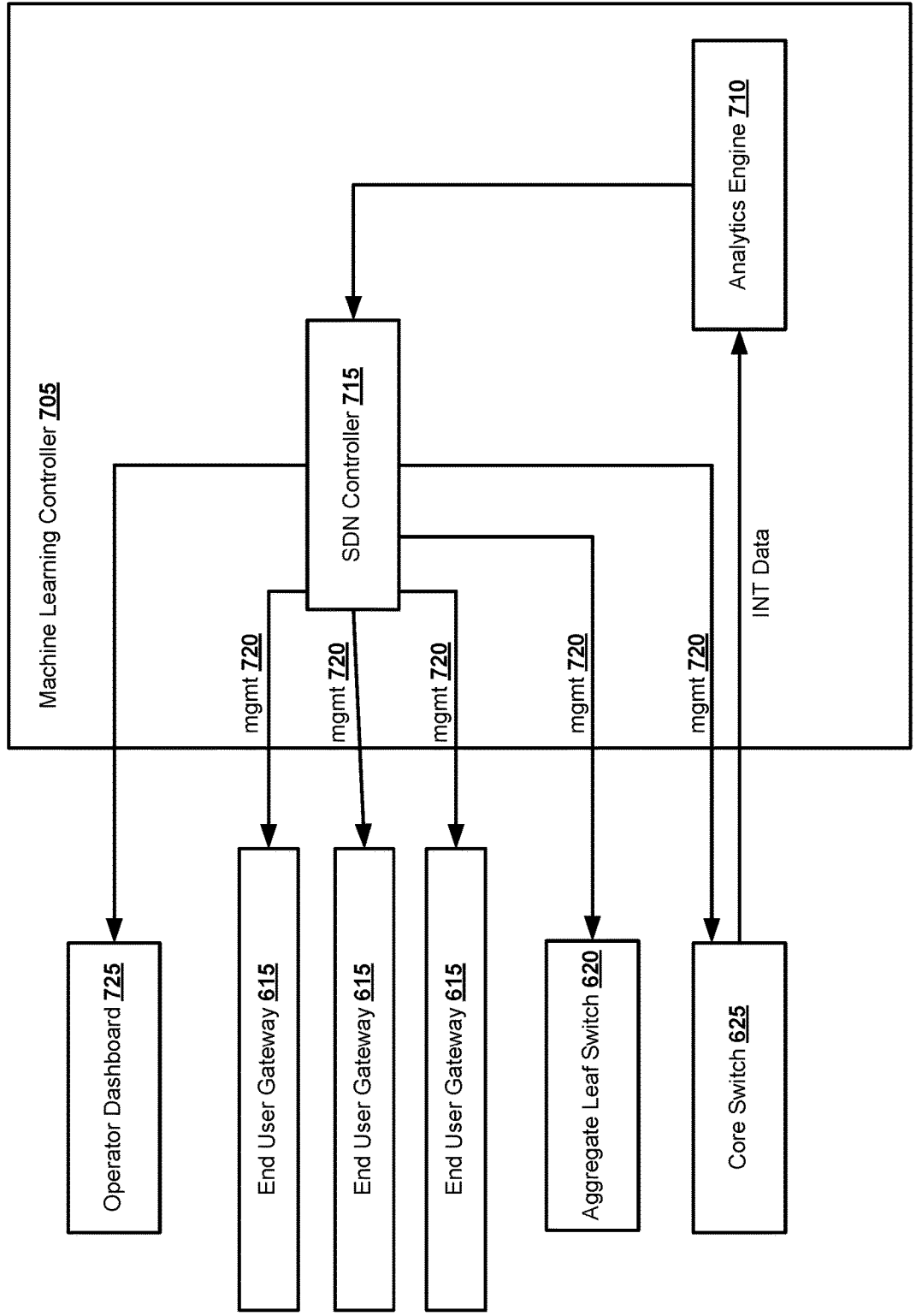
FIG. 7 is a schematic illustration of control plane architecture in accordance with the system depicted in FIG. 4.

FIG. 7 is a schematic illustration of a control plane architecture 700 in accordance with the system 400, FIG. 4. In an exemplary embodiment, the control plane architecture may be further implemented in a complementary fashion with the data plane architecture 600, FIG. 6. In the exemplary embodiment, the architecture 700 includes a machine learning controller 705 having an analytics engine 710 and a SDN controller 715. The analytics engine 710 is configured to receive INT data from a core switch (e.g., the core switch 625, FIG. 6) for analysis, and then transmit results to the SDN controller 715. The SDN controller 715 is configured to control P4-enabled devices, such as the relevant devices depicted in architecture 600, including without limitation the end user gateways 615, the aggregate leaf switch 620, and the core switch 625. In an embodiment, the SDN controller 715 uses a management interface 720, which may itself include a variety of protocols, such as at least GRPC, Thrift, HTTP, and/or RPC. The specific protocol used may vary based on the target architecture of the device and the specifics of the use case. In some embodiments, the SND controller 715 provides alerts and telemetry data to one or more users through an operator dashboard 725.

In some embodiments, SDN controller 715 may be similar to ML driven SDN controller 460, FIG. 4, and analytics engine 710 may be similar to analytics engine 450, FIG. 4.

Figure 8:
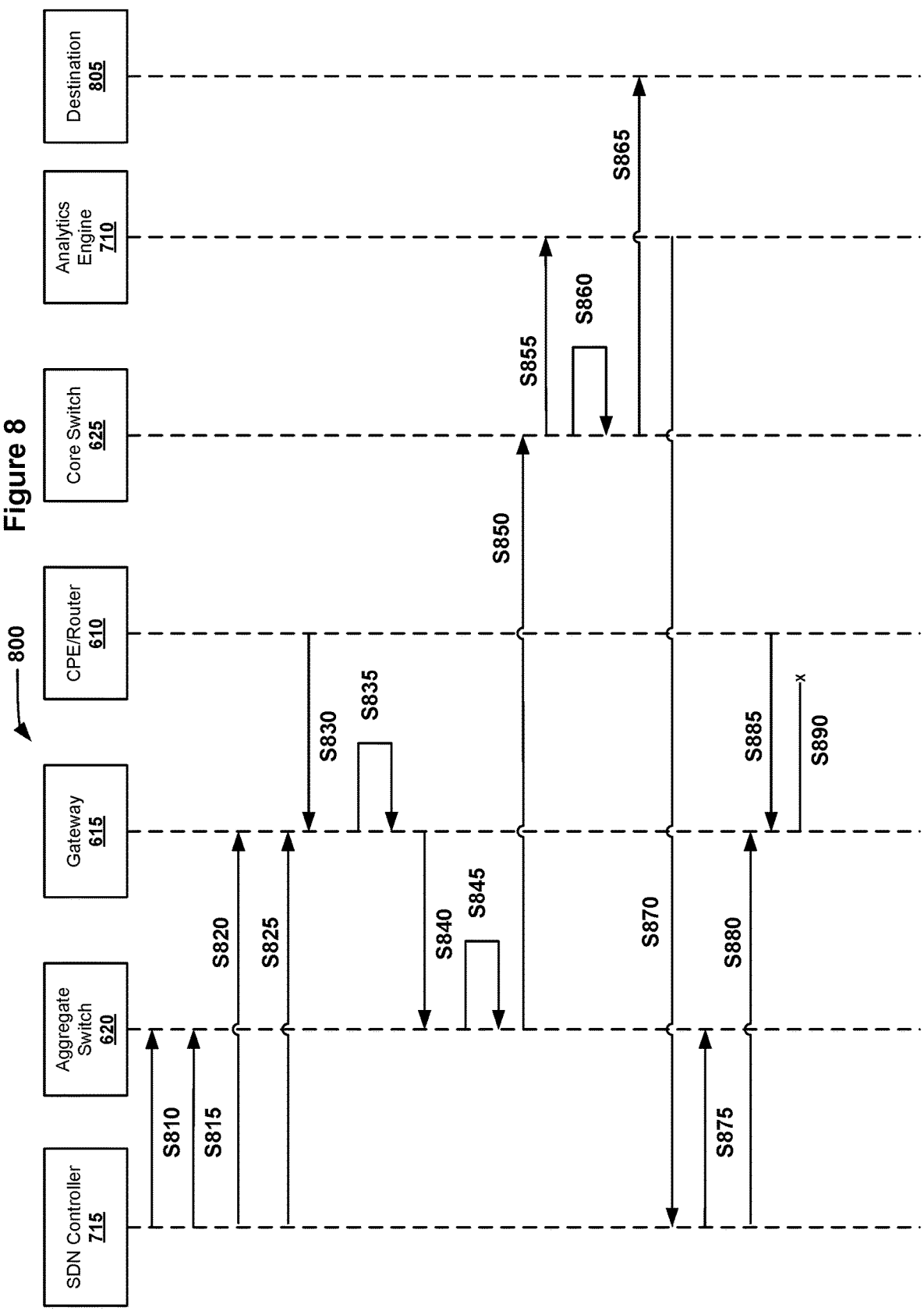
FIG. 8 is a data flow diagram for a process for detecting and responding to a distributed denial of service attack originating from an end user network using the architectures depicted in FIGS. 6 and 7.

FIG. 8 is a data flow diagram of a process 800 for detecting and responding to a distributed denial of service attack originating from an end user network using the architectures 600 and 700, FIGS. 6 and 7, respectively. In the exemplary embodiment, process 800 is implemented with respect to a destination 805, and begins at step S810, in which the SDN controller 715 creates a forwarding pipeline to the aggregate switch 620. In step S815, the SDN controller 715 adds rules to the forwarding pipeline and informs the aggregate switch 620 of those rules. In step S820, the SDN controller 715 creates a forwarding pipeline to the gateway 615. In step S825, the SDN controller 715 adds rules to the forwarding pipeline and informs the gateway 615 of those rules.

In step S830, the CPE/Router 610 transmits a packet to the gateway 615. In an exemplary embodiment of step S830, the packet is a part of a UDP Flood DDoS attack. In step S835, the gateway 615 inserts INT data into the packet. In step S840, the gateway 615 then transmits the packet to the aggregate switch 620. In step S845, the aggregate switch 620 inserts INT data into the packet and, in step S850, the aggregate switch 620 transmits the packet to the core switch 625. In step S855, the core switch 625 clones the packet and transmits the cloned packet, which includes the INT data, to the analytics engine 710. In step S860, the core switch 625 removes the INT data from the packet and, in step S865, the core switch 625 transmits the packet to the packets destination 805.

In step S870, the analytics engine 710 determines that the packet is a part of a DDoS attack and transmits an alert to the SDN controller 715. In step S875, the SDN controller 715 transmits a blocking rule to the aggregate switch 620. In step S880, the SDN controller 715 transmits the blocking rule to the gateway 615. In step S885, the gateway 615 may then receive a packet from the CPE/Router 610. In step S890, the gateway 615 drops the packet.

As described above with respect to process 800, the first packet of the UDP flood DDoS attack may get through, but the Machine Learning Controller 705 (shown in FIG. 7) detects this first packet and updates the rules on the relevant P4-enabled devices. Subsequent packets may then be advantageously blocked at the gateway 615, such that the network is protected from the flood of traffic from this type of attack.

Figure 9:
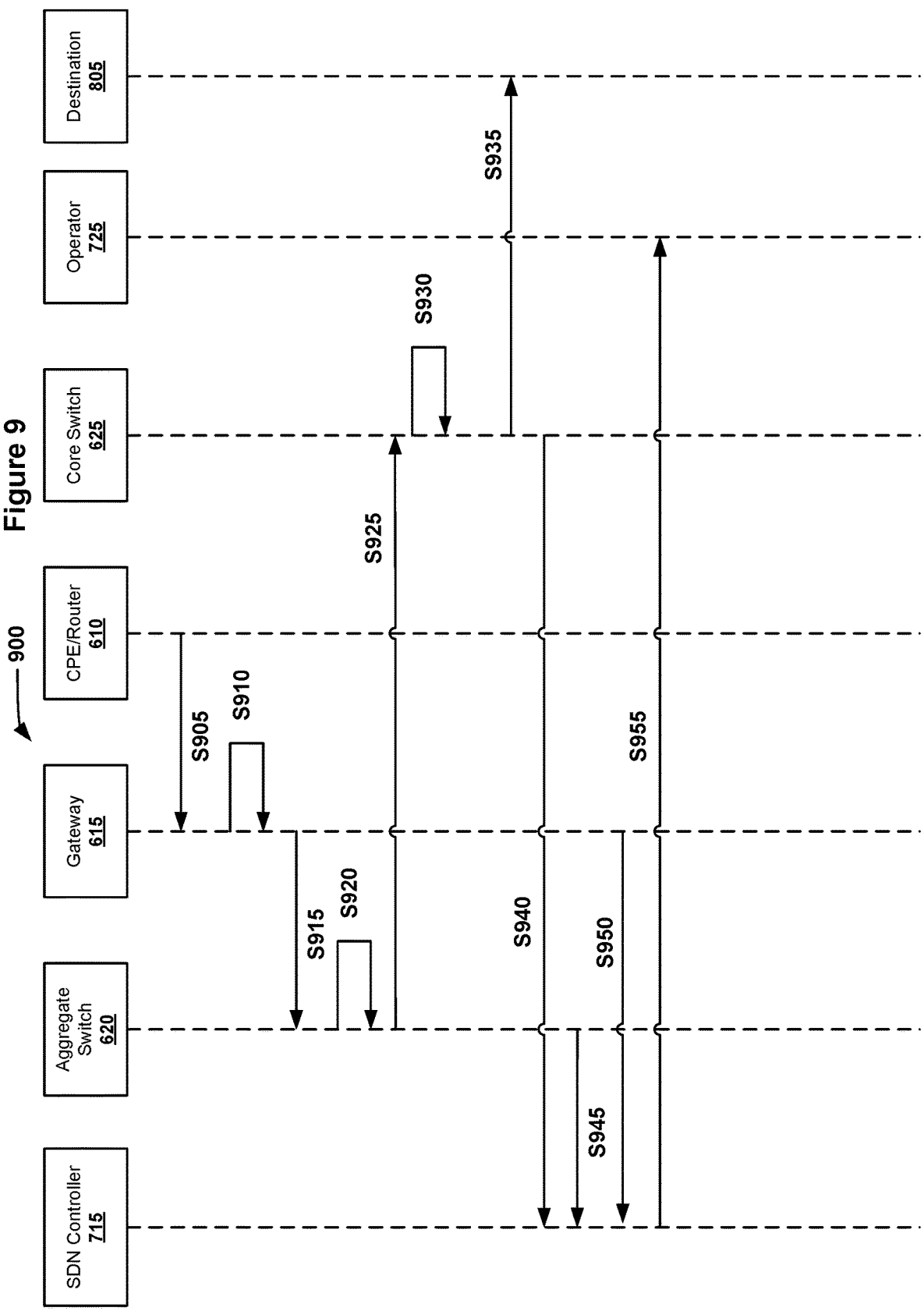
FIG. 9 is a data flow diagram for a process of monitoring packet communications using the architectures depicted in FIGS. 6 and 7.

FIG. 9 is a data flow diagram of a process 900 for monitoring packet communications using the architectures 600 and 700, FIGS. 6 and 7, respectively. In an exemplary embodiment of process 900, normal packet communications occur, and process 900 begins at step S905, in which the CPE/Router 610 transmits a packet to the gateway 615. In an exemplary embodiment of step S905, the transmitted packet is a normal packet, and not a part of an attack. In step S910, the gateway 615 inserts INT data into the packet. In step S915, the gateway 615 then transmits the packet to the aggregate switch 620. In step S920, the aggregate switch 620 inserts INT data into the packet and, in step S925, transmits the packet to the core switch 625. In step S930, the core switch 625 removes the INT data from the packet and, in step S935, transmits the packet to the packet destination 805.

As described above steps S905 through S935 of process 900 therefore represent "normal" communication. In an exemplary embodiment of process 900, the following steps S940 though S955 are describes as being looped every N seconds (e.g., for telemetry purposes). Accordingly, in step S940, the core switch 625 transmits S940 telemetry data from the INT data of packets that have reached the core switch 625. In an exemplary embodiment of step S940, the core switch 625 transmits the telemetry data to the SDN controller 715. In step S945, the aggregate switch 620 transmits the respective telemetry data thereof to the SDN controller 715. In step S950, the gateway 615 also transmits the respective telemetry data thereof to the SDN controller 715. In exemplary embodiments of steps S945 and S950, the telemetry data is transmitted automatically, such as according to one of the rules set by the SDN controller 715. In other embodiments, the telemetry data is transmitted upon request. In step S955, the SDN controller 715 aggregates the telemetry data and transmits S955 the aggregated telemetry data to the operator dashboard 725.

Transparent Security Architecture

Transparent Security Architecture refers to the use of programmable data plane capabilities to enable real-time packet processing, high-resolution packet inspection, and in-band network telemetry (INT). INT enables the respective architectures of the present embodiments to identify compromised devices quickly. Such exemplary architectures may then be more readily enabled and advantageously deployed at any point in the network, from the core network to residential and business customer premises.

Rather than being limited to an out-of-band sampling of packets, the present Transparent Security Architecture inspects every packet and add additional INT data to the packet header for further processing upstream. In an exemplary embodiment, the present Transparent Security Architecture focuses on inspecting, finding, and blocking malicious packets as close to the source as possible by adding details about the packet's source device, exact route through the network, and travel duration. INT data in an enriched packet header may then be used by upstream processes to identify traffic patterns and then act on that information.

Figure 10:
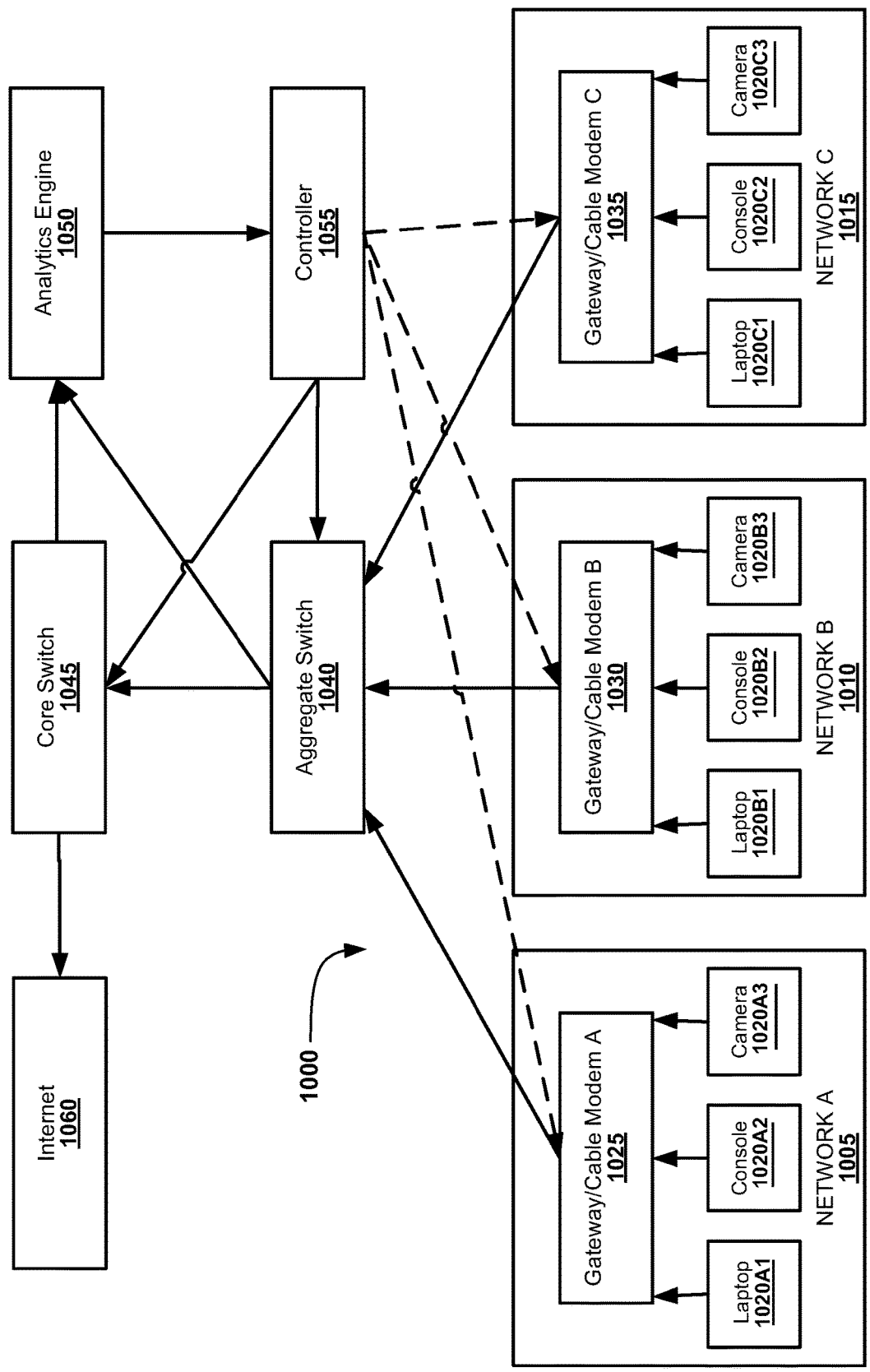
FIG. 10 is a schematic illustration of a data plane architecture in accordance with the system depicted in FIG. 4.

FIG. 10 is a schematic illustration of a data plane architecture 1000, which may be implemented, for example, in accordance with system 400, FIG. 4. In the exemplary embodiment depicted in FIG. 10, data plane architecture 1000 is configured to service a plurality of networks (Network A 1005, Network B 1010, and Network C 1015), each such network in turn servicing a plurality of devices 1020 (e.g., laptops, consoles, cameras, etc.) associated with a plurality of end users. Although not shown in FIG. 10, each device 1020 may be connected with a CPE/Router 610 (shown in FIG. 6) on the user premises.

In this embodiment, each device 1020 is connected to a gateway/modem (Gateway A 1025, Gateway B 1030, and Gateway C 1035). In some embodiments, CPE/Router 610 and gateway/modem 1025-1035 are integrated into the same device. In other embodiments, CPE/Router 610 and gateway/modem 1025-1035 are separate devices, which may be remotely located from one another. In an exemplary embodiment, gateway 1025-1035 connects devices 1020 to the core network through an aggregate switch 1040, and aggregate switch 1040 connects to a core switch 1045. In some embodiments, there may be multiple aggregate switches 1040 connected to the core switch 1045, where multiple aggregate switches 1040 each may be associated with respective multiple networks 1005-1015.

In the exemplary embodiment, aggregate switch 1040 and core switch 1045 are P4-enabled. In some embodiments, one or more additional devices may be disposed between the P4-enabled switches, including without limitation an Optical Communications Module Link Extender (OCML), a DPA, and a modem termination system (MTS) or a cable MTS (CMTS).

In some embodiments, where gateways 1025-1035 are not PA-enabled, aggregate switch 1040 may create an L2 over L3 tunnel, or a Generic Rooting Encapsulation (GRE) tunnel.

In the exemplary embodiment, different combinations of CPE/Router 610, gateways 1025-1035, aggregate switches 1040, and core switches 1045 may be P4-enabled. As more of such devices or elements are P4-enabled, more particular use cases and analyses may be made available. In an embodiment, the architecture of the present systems and methods may be implemented in stages. For example, gateway A 1025 and aggregate switch 1040 may be P4-enabled, thereby enabling an improved capability for architecture 1000 to monitor devices 1020 from the "left-side" end user premises. Thus, as time and costs allow, other gateways, such as gateway B 1030 and gateway C 1035, may be subsequently P4-enabled according to the present techniques, even if not so initially enabled.

In some embodiments, device 1020 may be similar to device 605 (shown in FIG. 6) and/or user computer device 405 (shown in FIG. 4). Additionally, gateways A-C 1025-1035 may similar to gateway 615 (shown in FIG. 6) and/or gateway 420 (shown in FIG. 4), aggregate switch 1040 may be similar to aggregate leaf switch 620 (shown in FIG. 6) and/or switch 435 (shown in FIG. 4), and core switch 1045 may be similar to core switch 625 (shown in FIG. 6) and/or switch 435 (shown in FIG. 4).

In an exemplary embodiment, architecture 1000 further includes an analytics engine 1050 for monitoring messages transmitted to and from networks 125-135 associated with core switch 1045. In some embodiments, analytics engine 1050 is in communication with one or more of aggregate switch 1040 and core switch 1045. In further embodiments, analytics engine 1050 may also be in communication with one or more of gateways 125-135. Analytics engine 1050 thus serves as the intelligent core of architecture 1000, and further functions to analyze a stream of packets containing enriched header data, such as P4.INT data, including without limitation, message source data including one or more of a MAC address, a port, an IP address, and/or time stamps and queue information.

In an exemplary embodiment, analytics engine 1050 may be further configured to make inferences relative to generally defined patterns. Such patterns may, for example, represent the system goals, such as DDoS mitigation, QoS (Quality of Service), and proactive network maintenance (PNM). In exemplary operation of analytics engine 1050, when a pattern is matched, analytics engine 1050 informs a controller 1055, which, in this embodiment, is responsible for implementing network changes through architecture 1000. In some embodiments, analytics engine 1050 may further include without limitation programming and/or algorithms for one or more of: (a) analysis of header and INT data for packets traversing through the architecture 1000; (b) determination of when an attack occurs; (c) sharing the attack signature with controller 1055 to mitigate the attack; and (d) notifying controller 1055 when the attack has ended.

In further exemplary operation, analytics engine 1050 may receive data from the enriched packet headers of messages that are traveling through architecture 1000, in order to determine the health of networks 1005-1015, and also to detect when problems are occurring (e.g., DDoS attacks). In this example, analytics engine 1050 reports the health or status of the messages being transmitting through architecture 1000 to controller 1055, and controller 1055 may then transmit one or more rules to one or more of core switch 1045, aggregate switch 1040, and gateways 1025-1035. In one example, such as in the case of a DDoS attack, during the attack, controller 1055 may provide to automatically drop packets addressed to a specific IP address, in particular where that specific address is the target of the attack. This type of rule would lessen the burden of the message traffic from the attack, and while still allowing legitimate message traffic to still be transmitted over architecture 1000.

In the exemplary embodiment, analytics engine 1050 uses enhanced header information to monitor messages being transmitted over the architecture. As described in more detail below with respect to FIG. 11, when a message is transmitted over architecture 1000, such as from a particular device 1020, the message may be encapsulated in a new packet with an enriched header while the message is in the architecture. In this example, the enriched header includes telemetry data, such as, but not limited to, (i) a source identifier for identifying the originating device 1020, (ii) travelling identifiers for identifying the network devices through which the message travels, and (ii) quality of service identifiers for determining the operation of the devices through which the message travels.

In this embodiment, such devices may include one or more of gateways 1025-1035 and/or aggregate switches 1040, depending on the configuration of architecture 1000 and the route that the message takes. The encapsulating packet, including the header, may then be removed by core switch 1045. In further operation, the message may then also be sent to Internet 1060, while the enriched header and other information about the message may be transmitted to analytics engine 1050. Analytics engine 1050 may then determine the type of message and other information about the message, including a comparison with other messages that analytics engine 1050 has analyzed.

For example, analytics engine 1050 may determine that the message itself indicates that it originated from one particular device 1020 (e.g., laptop $1020_{B1}$) on network B 1010, but the enriched header may show that the message came from a different device 1020 (e.g., camera 102003) in network C 1035. According to the exemplary embodiments described herein, this discrepancy may be flagged by the analytics engine 1050 so that messages purporting to be from laptop $1020_{B1}$ of network B 1010 are subject to more strict scrutiny. In another example, analytics engine 1050 may determine that multiple messages have been transmitted to a single IP address from multiple devices 1020 in very brief time duration (e.g., a second). In such instances, analytics engine 1050 may determine that the particular device 1020 at that IP address is under attack. Controller 1055 may then instruct one or more of core switch 1045, aggregate switch 1040, and gateways 125-135 to drop packets/messages addressed to that specific address.

In further exemplary operation, information used by analytics engine 1050 may be captured by particular devices through which the messages pass within architecture 1000, and then forwarded to analytics engine 1050 in line with the network traffic. When controller 1055 is informed by analytics engine 1050 that a network goal (e.g., DDoS attack, QoS, etc.) has been detected, controller 1055 may update action tables within the particular devices 1020, through a control plane management interface thereof (e.g., using protocols such as GRPC or Thrift, not shown in FIG. 10). In this manner, devices 1020 may gain additional capabilities within architecture 1000, and with a minimally intrusive controller 1055 activating the particular devices before detrimental consequences are experienced.

In this example, functionality of controller 1055 may additionally include one or more of: (a) management of the network configuration on switches and gateways; (b) pushing DDoS mitigation to managed devices; (c) removal of DDoS mitigation responsibility from managed devices; and (d) tracking of which devices may be participating in an attack through counters of dropped packets based on DDoS mitigation. Such managed devices may include one or more of core switch 1045, aggregate switch 1040, and gateways 125-135.

In the exemplary embodiment, functionality of core switch 1045 may additionally include one or more of: (a) management of the traffic between architecture 1000, Internet 1060, and core networks; (b) transmittal of enriched header data to analytics engine 1050; (c) adding data to the enriched header data; (d) removal of the enriched headers before transmitting to Internet 1060; and (e) mitigation of detected DDoS attacks.

In the exemplary embodiment, functionality of aggregate switch 1040 may additionally include one or more of: (a) management of the traffic between gateways 1025-1035 and core switch 1045; (b) adding data to the enriched header, such as, but not limited to, queue information, timing information, and IP addresses of devices in the route path; (c) forwarding of traffic between gateways 1025-1035 and core switches 1045; and (d) mitigation of DDoS attacks from core switches 1045 and gateways 1025-1035.

In some embodiments, one or more of gateways 1025-1035 are enhanced, such as with a P4-enabled chip including functionality, such as, but not limited to: (a) management of the traffic between the customer premises and the access network; (b) adding the enriched header and enriched header data; and (c) mitigation of DDoS attacks from individual devices 1020.

In some embodiments, architecture 1000 may be further configured to detect attacks from one network (e.g., network 1005) to another network (e.g., network 1015) within the same architecture. For example, if a device $1020_{A1}$ in network A 1005 is attacking a device $1020_{C2}$ in network C 1015, architecture 1000 may not detect the attack if the analysis is only performed at core switch 1045. According to the present embodiments though, in such inter-network attacks, aggregate switch 1040 may advantageously detect the abnormal amount of messages between networks 1005 and 1015, and/or report the inter-network messages to analytics engine 1050.

In some embodiments, telemetry data and alerts from analytics engine 1050 may be provided to a dashboard or network operations center (NOC) server for integration with other analytics.

FIG. 10 is illustrated, for ease of explanation, as including three networks 1005-1015 and three devices 1020. However, the person of ordinary skill in the art, after reading and comprehending the present application, will understand that (i) architecture 1000 may include any number of devices 1020 on a particular network 1005-1015, (ii) any number of networks 1005-1015 may be connected to a particular aggregate switch 1040, and (iii) any number of aggregate switches 1040 may be connected to a particular core switch 1045, all without departing from the scope of the present embodiments. The size of the particular network architecture 1000 may thus vary based on user needs and preferences.

Figure 11:
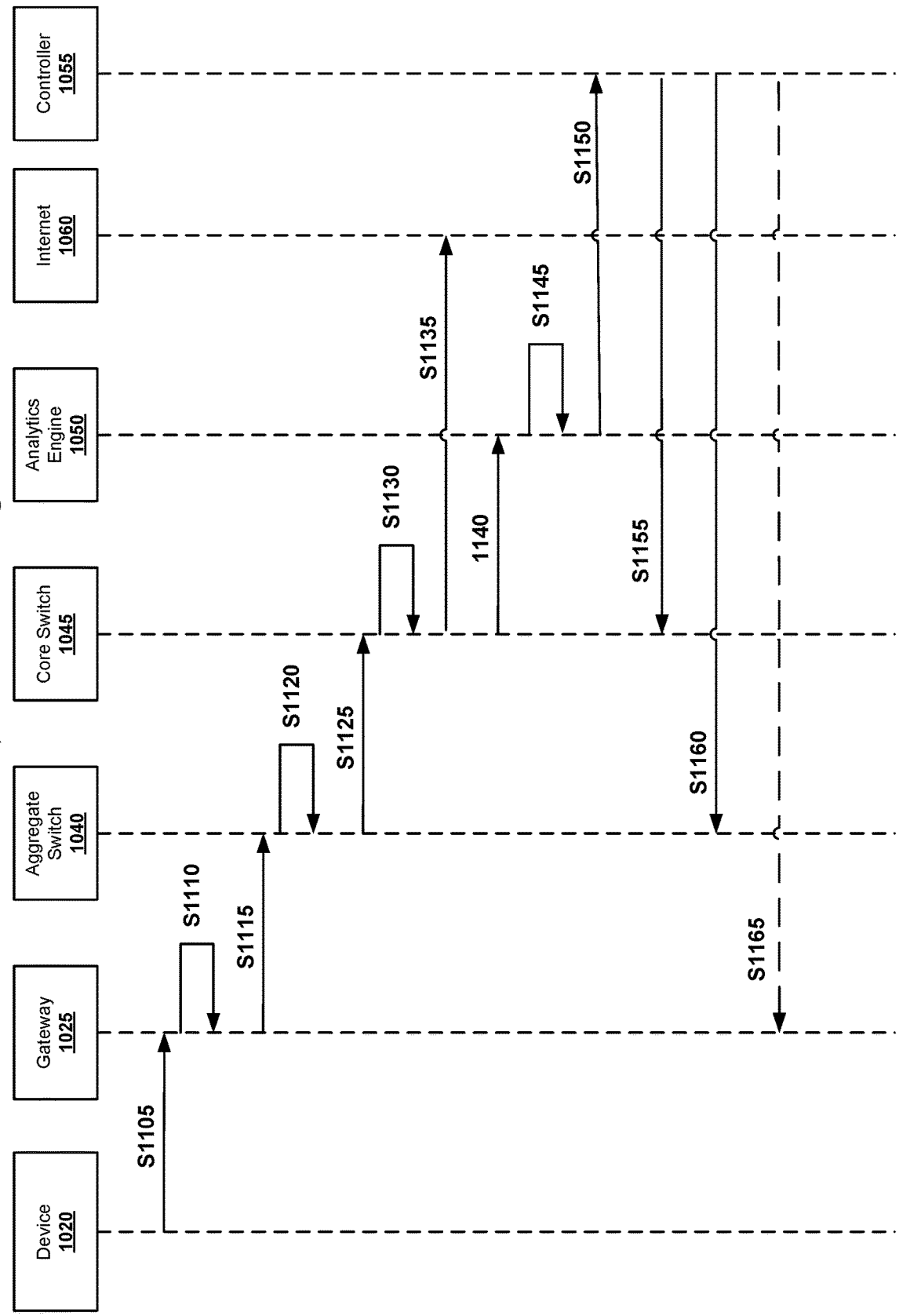
FIG. 11 is a data flow diagram for a process for monitoring and mitigating packet communications using the architecture depicted in FIG. 10.

FIG. 11 is a data flow diagram depicting a process 1100 for monitoring and mitigating packet communications using, for example, architecture 1000, depicted in FIG. 10. As shown in process 1100, in step S1105, a message is transmitted from a device 1020 to the corresponding gateway 1025. In step S1110, gateway 1025 encapsulates the message in a specialized packet. In an exemplary embodiment of step S1110, the packet includes an enriched header, which in turn includes the media access control (MAC) address for the source device 1020 and an identifier for gateway 1025. In step S1115, the packet is transmitted to aggregate switch 1040. In step S1120, aggregate switch 1040 adds its identifying information to the enriched header.

In some instances, gateway 1025 may have been unable to generate the encapsulating packet and enriched header. Accordingly, in an embodiment, the enriched header may be further configured to tracks the QueueDepth of each device that transmits the encapsulated package. In such cases, the QueueDepth tracks how long the message took to go through the device. In some embodiments, the timestamp of when the packet/message is received by the device, and/or the timestamp of when the packet/message is transmitted by the device, are added to the enriched header.

In at least one embodiment of step S1115, aggregate switch 1040 receives the un-encapsulated message and encapsulates the message in a packet with an enriched header. According to this example, in step S1120, gateway 1025 is listed as the source for the message and aggregate switch 1040 adds its identifier to the enriched header. In some embodiments, aggregate switch 1040 may also be in communication with gateway 1025 via a tunnel, such as an L2 over L3 tunnel or a GRE tunnel. This communication method allows aggregate switch 1040 to know the MAC address for the particular device 1020 when creating the enriched header for the encapsulating packet.

In further operation of process 1100, in step S1125, encapsulated packet is transmitted to core switch 1045. In step S1130, core switch 1045 removes the encapsulation from the message. In step S1135, core switch 1045 transmits the message to Internet 1060 for transmission to its final destination. In step S1140, core switch 1045 also transmits information from the enriched header of the encapsulation packet and the message to analytics engine 1050.

In step S1145, analytics engine 1050 analyzes the provided information to determine if the message was a malicious message, such as a part of a DDoS attack. Accordingly, in step S1150, upon determination by analytics engine 1050 that the message is part of a malicious attack, analytics engine 1050 transmits information to controller 1055, which may then determine one or more rules to mitigate the malicious message and its effect on architecture 1000. Accordingly, the one or more rules are transmitted, (i) in step S1155, to core switch 1045, (ii) in step S1160, to aggregate switch 1040, and (iii) in optional step S1165, to one or more of gateways 125-135. Thus, in exemplary operation of process 1100, if a malicious message is determined to be a part of a DDoS attack, the one or more rules may instruct devices to drop packets addressed to a particular target. The one or more rules may also instruct devices to drop messages from the source device 1020 or source network 1005-1015, or messages that may be in the same format as the malicious format.

In at least one embodiment of step S1145, analytics engine 1050 is continuously analyzing the messages to determine when the DDoS attack ends. Thus, once analytics engine 1050 determines that the attack is over, analytics engine 1050 may inform the controller 1055 of the end of attack. Once so informed, controller 1055 may then update one or more of core switch 1045, aggregate switch 1040, and/or one or more of gateways 125-135 to remove the rule. According to this example, the system of architecture 1000 is enabled to advantageously keep the rules current and thus reduce the processing required by each device. That is, the more rules that each device must follow, the longer it will take that device takes to process messages, since each message is checked against the present rules.

In some embodiments, one or more of analytics engine 1050 and controller 1055 transmit messages to a user device (not shown in FIG. 11) associated with a user associated with a compromised device. For example, one or more of analytics engine 1050 and controller 1055 may be configured to determine that all IP cameras of a particular user are compromised. The one or more of analytics engine 1050 and controller 1055 may then send information about the breach/compromise to the particular user, including instructions on how to fix the issue, such as, but not limited to, taking the particular devices 1020 off-line, patches to apply to the particular device(s) 1020, and/or one or more security settings to change on the particular device(s) 1020.

In some embodiments, analytics engine 1050 uses machine learning to learn patterns to recognize malicious activities and attacks in real-time. IN such cases, analytics engine 1050 may use historical information as training data, and then analyze the training data to determine one or more patterns associated with malicious activity. For example, analytics engine 1050 may determine that a significant increase in QueueDepth occurs at the beginning of a DDoS attack, and then monitor for that particular activity to detect an ongoing or start of a DDoS attack.

In some other embodiments, where both aggregate switch 1040 and core switch 1045 both transmit information to analytics engine 1050, analytics engine 1050 may be further configured to determine when there is an issue between aggregate switch 1040 and core switch 1045, such as bad link leading to dropped packets.

In an embodiment, the enriched header may be preserved when the message is transmitted (e.g., step S1140) to Internet 1060. For example, the service provider may track the information in the enriched header to have any understanding of the make-up of architecture 1000 and/or to know when architecture 1000 is detecting attacks. In such cases, the enriched header may either be added to the payload of the message, or the encapsulated message may be transmitted.

In an embodiment, analytic engine 1050 may be further configured to recognize patterns in the messages being transmitted through architecture 1000, and then transmit (e.g., step S1150) the signature of the pattern to controller 1055. The signature may include, but is not limited to, one or more of the destination IP address, the destination port, and the packet size. When controller 1055 receives the alert signature, controller 1055 may update the rules for devices and/or P4-enabled devices, such as core switch 1045, aggregate switch 1040, and gateways 125-135. In this example, the rules may be updated with information about the match, as well as the action for the corresponding device. An example of such an action may be to drop all messages addressed to or from a specific address.

In an embodiment, controller 1055 may be further configured to transmit a warning or alert to the user. This warning or alert may include information about the compromised device 1020, and/or about another device causing the issue. Receipt of such information thus advantageously enables the user to better understand which of the user's own devices 1020 may be causing the problem, and also how to rectify the situation. In some embodiments, this warning or alert may also be transmitted to the operator of architecture 1000.

Figure 12:
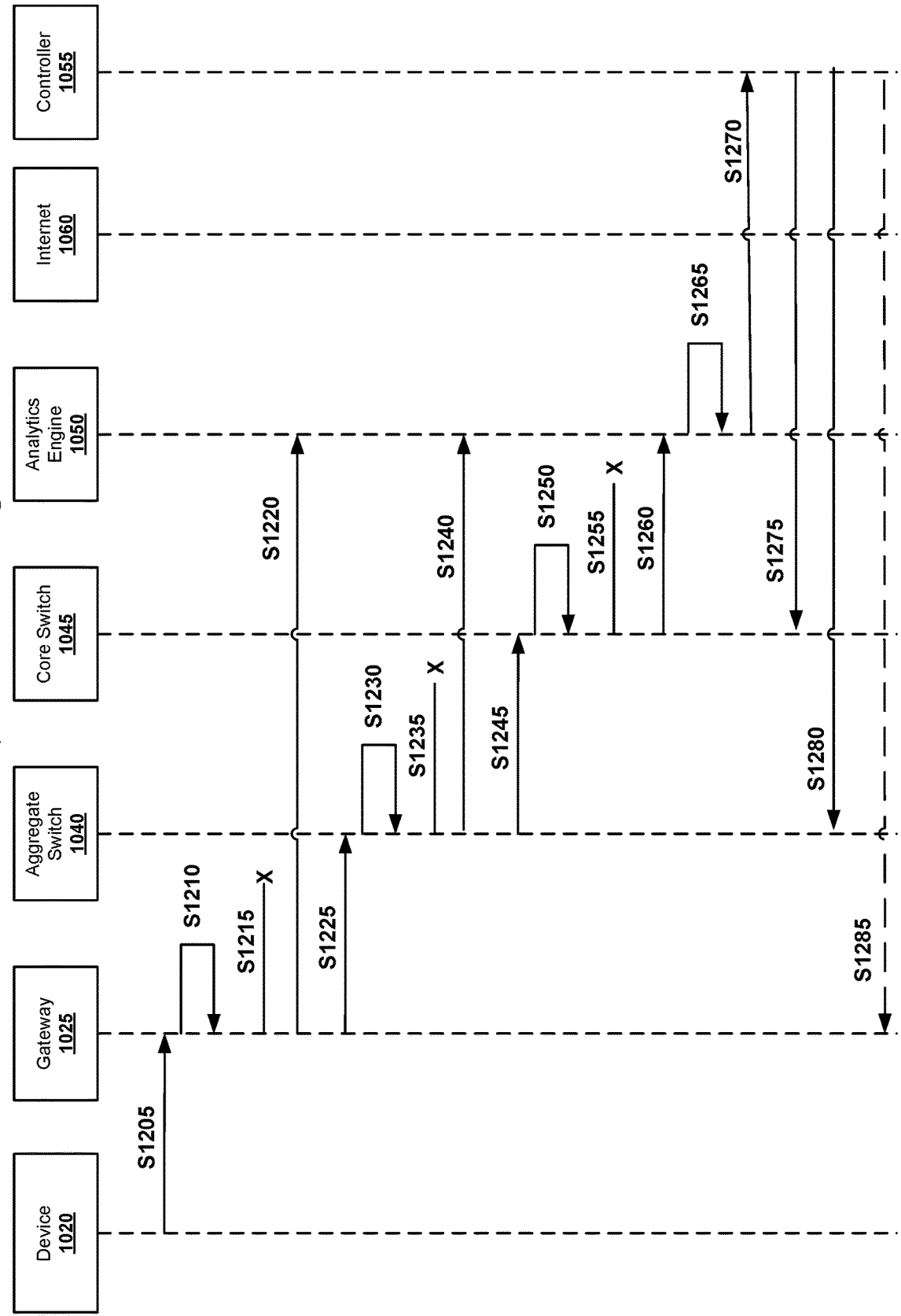
FIG. 12 is a data flow diagram for a process for mitigating an attack using the architecture depicted in FIG. 10.

FIG. 12 is a data flow diagram depicting a process 1200 for mitigating an attack using, for example, architecture 1000, depicted in FIG. 10. In step S1205 of process 1200, a particular device 1020 transmits a message to its corresponding gateway 1025. In step S1210, gateway 1025 analyzes the message in view of its processing rules, if any. In an exemplary embodiment of step S1210, some such rules are provided by controller 1055 (e.g., step S1165, FIG. 11). In step S1215, if the message is determined to be malicious or otherwise unwanted based on those rules, gateway 1025 drops the message.

In further exemplary operation, in step S1220, gateway 1025 reports to analytics engine 1050 that the message was dropped (i.e., in step S1215). Alternatively, in step S1225 the message is transmitted to aggregate switch 1040, such as in the case where the message is acceptable according the rules (i.e., not dropped in step S1215), or in the case where gateway 1025 is unable to analyze the message (i.e., in S1210).

In step S1230, aggregate switch 1040 analyzes the message based on one or more stored rules, such as those provided by controller 1055. At controller 1055, if the message is determined to be malicious or otherwise unwanted based on those rules, in step S1235, aggregate switch 1040 drops the message, and in step S1240, aggregate switch 1040 reports to the analytics engine 1050 that the message was dropped. Alternatively, in step S1245, the message is transmitted to core switch 1045 in the case where the message is acceptable according to the rules, or in the case where aggregate switch 1040 was unable to analyze the message.

In step S1250, core switch 1045 analyzes the message based on one or more stored rules, such as those provided by controller 1055. If the message is determined to be malicious or otherwise unwanted based on those rules, in step S1255, core switch 1045 drops the message. In step S1260, core switch 1045 may report to the analytics engine 1050 that the message was dropped.

In step S1265, analytics engine 1050 analyzes the reports from different devices about dropped messages. For example, analytics engine 1050 may determine that the DDoS attack has ended because no messages for the target have been dropped in the last five seconds. Based on the analysis, in step S1270, analytics engine 1050 may further transmit to controller 1055 about the current situation and the analysis, and update the rules accordingly. In further operation of process 1200, controller 1055 may then send the updated rules, (i) in step S1275, to core switch 1045, (ii) in step S1280, to aggregate switch 1040, and (iii) in optional step S1285, to one or more of gateways 125-135. According to these advantageous techniques, the rules enable architecture 1000 to achieve goals for dropping malicious messages at the first point of enforcement within architecture 1000, such as gateways 125-135, aggregate switch 145, and/or core switch 150.

The present embodiments further enable architecture 1000 to be transmitting legitimate messages while malicious messages are being dropped. That is, the implementation of rules and the processes described above allow malicious traffic to be stopped, but while still protecting and delivering legitimate messages. Furthermore, by dropping the malicious traffic at the first point of enforcement, the operating bandwidth of architecture 1000 may be preserved and protected for legitimate messages.

In some embodiments, architecture 1000 may be further configured to receive (e.g., at one or more of switches 435, FIG. 4), a packet from gateway (e.g., gateway 420) of a plurality of gateways, such as gateways 1025-1035. In this example, switches 435 may include aggregate switch 1040 and/or core switch 1045. The one or more of switches 435 may thus insert metadata into an enriched header of the packet, and this metadata may include actual routing information for the packet. The one or more of switches 435 may then transmit the packet to the relevant router (e.g. router 440, FIG. 4). In this example, router 440 may further include core switch 1045. Router 440 may then remove the enriched header of the packet, and then transmits the packet to its subsequent destination. In this example, router 440 may be further configured to transmit the enriched header to an analytics engine, such as analytics engine 450, FIG. 4, or analytics engine 1050, FIG. 10.

The analytics engine (e.g., analytics engine 450, 1050) then analyzes the metadata in the enriched header of the packet and determines whether the packet was a malicious packet based on the analysis. This metadata may include one or more of a source of the packet, a destination of the packet, identifiers of one or more switches through which the packet was routed, and queue information. The analytics engine 450/1050 may then transmit to a system controller (e.g., system controller 460, FIG. 4, controller 1055, FIG. 10) the determination that the packet was a malicious packet. In an exemplary embodiment, system controller 460/controller 1055 is in communication with router 440 and one or more of switches 435. In some embodiments, system controller 460/controller 1055 may be further configured to generate instructions for one or more of router 440 and switches 435 to mitigate subsequent malicious packets. System controller 460/controller 1055 may then transmit the instructions to one or more of router 440 and switches 435.

After receiving the instructions, router 440 may receive a subsequent packet, upon which router 440 compares the subsequent packet to the received instructions. In the case where the subsequent packet matches the instructions, router 440 drops or discards the subsequent packet based on the comparison. By dropping or discarding the subsequent packet, router 440 effectively removes the subsequent malicious packet from the processing and bandwidth of architecture 1000, thereby allowing greater resources for legitimate packets. Thus, if a packet matches a malicious attack profile, the relevant device may be instructed to drop the packet and not further transmit the dropped packet. In some embodiments, the device may further log that the packet was dropped, or may keep a count of the number of dropped packets, or the number of dropped packets in a specific period of time.

After receiving the instructions, one of switches 435 may receive a subsequent packet. Similar to the router techniques, the particular switch 435 may compares the subsequent packet to the received instructions, and then drop or discard the subsequent packet if the subsequent packet matches the instructions, based on the comparison.

In an embodiment, one of analytics engine 450/1050 and controller 460/1055 determines that a malicious attack is over. Controller 460/1055 may then transmit the instructions to router 440 and/or one or more of switches 435 to remove previous instructions.

In some embodiments, controller 460/1055 generates instructions for at least one of the plurality of gateways 420/1025-1035. Controller 460/1055 may then transmit the instructions to the particular gateway 420/1025-1035, which may include a P4 enabled NIC 425 (shown in FIG. 4). The particular gateway 420/1025-1035 may also receive a subsequent packet. The gateway 420 may then compares the subsequent packet to the instructions, and drop or discard the subsequent packet based on the comparison if the subsequent packet matches the instructions.

In some embodiments, analytics engine 450/1050 determines whether the packet was malicious based on historical packet information from previously transmitted packets. In some further embodiments, analytics engine 450/1050 determines that the packet was malicious based on a comparison of routing information in the enriched header and source information in the packet.

In some embodiments, one or more of switches 435 are configured to be in communication with each gateway 420/1025-1035 of the plurality of gateways via a virtual tunnel. The particular switch 435 may thus retrieve the packet through the virtual tunnel to the gateway 420/1025-1035, and then determine from which user computer device (e.g., device 405, FIG. 4, devices 1020, FIG. 10) the packet originates. In such cases, the particular switch 435 may further add an identifier to the enriched header for the determined user computer device.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles or mobile devices, or associated with smart infrastructure or remote servers), and/or through implementation of computer-executable instructions stored on non-transitory computer-readable media or medium.

Additionally, the computer systems discussed herein may include additional, fewer, or alternate functionality, including that discussed elsewhere herein, and may include or be implemented according to computer-executable instructions stored on non-transitory computer-readable media or medium. Unless described herein to the contrary, the various steps of the several processes may be performed in a different order, or simultaneously in some instances.

Processors or a processing elements utilized with respect to the present systems and methods may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample (e.g., training) data sets or certain data into the programs, such as communication data of compromised and uncompromised devices, communication data from a wide variety of devices, and communication data of a wide variety of malicious sources.

The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning, such as deep learning, reinforced learning, or combined learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. The unsupervised machine learning techniques may include clustering techniques, cluster analysis, anomaly detection techniques, multivariate data analysis, probability techniques, unsupervised quantum learning techniques, associate mining or associate rule mining techniques, and/or the use of neural networks. In some embodiments, semi-supervised learning techniques may be employed. In one embodiment, machine learning techniques may be used to extract data about the device, network, policies, communications, activities, software, hardware, malicious code, and/or other data.

In the exemplary embodiment, a processing element may be trained by providing it with a large sample of communication data with known characteristics or features. Such information may include, for example, information associated with a specific device, type of device, device activity, network activity, software versions, and/or other data.

Based upon these analyses, the respective processing element of the present embodiments may learn how to identify characteristics and patterns that may then be applied to analyzing communication data. For example, the processing element may learn, with the user's permission or affirmative consent, to identify the necessary upgrades necessary for attached device, potential security vulnerabilities associated with different software, and communication data associated with those security vulnerabilities being compromised. This information may be used to determine how to modify communications to and from the device to prevent compromise of other devices and networks.

The exemplary embodiments provided herein describe an open intent based network controller (OINC) that is advantageously disposed within the core network, or in communication with the core network, to predict future network states and optimize the core network to adjust for those states. The OINC thus functions as a midbox capable of: (i) repeatedly evaluating the current state of the core network; (ii) determining potential future states of the core network; (iii) reducing the costs for operating the core network; and/or (iv) ensuring proper service to the network users.

The exemplary embodiments provided herein describe a system of P4 enabled devices, which may be advantageously disposed within the core network to monitor and managed the traffic emanating from a device/thing, and which advantageously protect the network from cybersecurity threats emanating from a device or connected "thing." The present system of P4-enabled devices thus functions as a midbox capable of: (i) tracking packet paths through the core network; (ii) analyzing the packets in real-time for potential threats; (iii) dynamically updating to block potential threats; (iv) constantly monitoring the flows of packet traffic; (v) reprogramming dynamically to drop malicious packets; and/or (vi) reporting telemetry to a user.

The improvements described herein may be achieved by performing one or more of the following steps: (a) storing a plurality of historical data associated with the core network; (b) receiving current state data from the core network; (c) comparing the plurality of historical data with the current state data to determine at least one future state of the core network; (d) adjusting the operation of the core network based on the at least one future state; (e) determining a plurality of possible future states of the core network; (f) determining a likelihood associated with each of the plurality of possible future states; (g) determining one or more adjustments to the operation of the core network based on the plurality of likelihoods; (h) calculating costs associated with the at least one future state of the core network; (i) determining one or more adjustments to the operation of the core network based on the calculated costs; (j) storing a plurality of past outcomes associated with the plurality of historical data; (k) comparing the plurality of historical data, the plurality of past outcomes, and the current state data to determine at least one future state of the core network; (l) receiving current state data from the core network on a periodic basis; and (m) adjusting the operation of the core network on a periodic basis, based in part on the current state data.

The improvements described herein may also be achieved by performing one or more of the following steps: (a) receiving, at one or more switches, a packet from a gateway of the plurality of gateways; (b) inserting, by the one or more switches, metadata into a header of the packet; (c) transmitting, from the one or more switches to the router, the packet; (d) analyzing, by the router, the metadata in the header of the packet; (e) determining, by the router, whether to route the packet to its destination based on the analysis; (f) analyzing, by the one or more switches, the metadata in the packet to determine whether to route the packet or drop the packet; (g) transmitting, by the one or more switches, at least one of the packet and the metadata associated with the packet to the analytics engine; (h) analyzing the at least one of the packet and the metadata for a pattern associated with a rule; (i) analyzing the at least one of the packet and the metadata for a pattern associated with a rule; (j) transmitting an alert to the controller if the pattern is matched; (k) updating one or more analysis rules with the one or more switches; (l) updating the one or more analysis rules in every device capable of analyzing the metadata; (m) receiving telemetry data from one or more devices capable of reading the metadata; and (n) removing the metadata from the header of the packet prior to transmitting the packet.

The aspects described herein may be implemented as part of one or more computer components, such as a client device and/or one or more back-end components, such as a SDN controller or OINC, for example. Furthermore, the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

Furthermore, the embodiments described herein improve upon existing technologies, and improve the functionality of computers, by more accurately predicting and/or identifying the present security status of one or more (or all) connected devices. The present embodiments improve the speed, efficiency, and accuracy in which such calculations and processor analysis may be performed. Due to these improvements, the aspects address computer-related issues regarding efficiency over conventional techniques. Thus, the aspects also address computer related issues that are related to computer security, for example.

Accordingly, the innovative systems and methods described herein are of particular value within the realm of core networks, which are a constantly evolving technology as there are constantly increased demands for more bandwidth and speed from consumers. The present embodiments enable more reliable updating and control of such devices, but without compromising data and communications. Furthermore, according to the disclosed techniques, service providers and network operators are better able to monitor and protect the networks from connected devices, and thereby protect other devices on the network. Moreover, the ability to more reliably route packets, but without adding additional risk to consumer data, greatly enhances the ability of manufacturers to realize secondary market revenue for a device, such as in the case of software updates to the device programming, or new commercial opportunities that may be exploited in association with the device (e.g., marketing promotions, cross-sales, seasonal activities).

Exemplary embodiments of systems and methods for managing and securing core networks are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for managing a core network, comprising:
one or more switches in communication with a plurality of gateways, wherein each gateway of the plurality of gateways are in communication with one or more user computer devices;
a router in communication with the one or more switches; and
a processor including a memory for storing computer-executable instructions, which, when executed by the processor, cause the system to:
  receive, at the one or more switches, a packet from a gateway of the plurality of gateways, wherein the packet includes a first header;
  predict at least one traffic change to the core network;
  replace the first header of the packet with an enriched second header including metadata that includes routing information for the packet, including queue information for the one or more switches, to route the packet from the router to a destination for the packet over a first route;
  transmit, from the one or more switches to the router, the packet including the enriched second header;
  dynamically reconfigure the first route based on the predicted traffic change;
  replace, by the router, the enriched second header of the packet with the first header of the packet; and
  transmit, from the router, the packet including the first header to the destination over the dynamically reconfigured first route.

2. The system in accordance with claim 1, further comprising an analytics engine, wherein the computer-executable instructions further cause the system to:
receive, at the analytics engine from the router, the enriched second header of the packet;
analyze, by the analytics engine, the metadata in the enriched second header of the packet; and
determine, by the analytics engine, whether the packet was a malicious packet based upon the analysis of the enriched second header.

3. The system in accordance with claim 2, wherein the computer-executable instructions further cause the system to transmit the determination that the packet was a malicious packet to a system controller, wherein the system controller is in communication with router and the one or more switches.

4. The system in accordance with claim 3, wherein the computer-executable instructions further cause the system to:
generate instructions for one or more of the router and the one or more switches to mitigate subsequent malicious packets; and
transmit the instructions to one or more of the router and the one or more switches.

5. The system in accordance with claim 4, wherein the computer-executable instructions further cause the system to:
receive, by the router, a subsequent packet;
compare, by the router, the subsequent packet to the instructions; and
drop, by the router, the subsequent packet based upon the comparison if the subsequent packet matches the instructions.

6. The system in accordance with claim 4, wherein the computer-executable instructions further cause the system to:
- receive, by a switch of the one or more switches, a subsequent packet;
- compare, by the switch, the subsequent packet to the instructions; and
- drop, by the switch, the subsequent packet based upon the comparison if the subsequent packet matches the instructions.

7. The system in accordance with claim 4, wherein the computer-executable instructions further cause the system to:
- determine, by the analytics engine, that a malicious attack is over; and
- transmit the instructions to one or more of the router and the one or more switches to remove previous instructions.

8. The system in accordance with claim 3, wherein the computer-executable instructions further cause the system to:
- generate instructions for at least one gateway of the plurality of gateways;
- transmit the instructions to at least one gateway;
- receive, by the at least one gateway, a subsequent packet;
- compare, by the at least one gateway, the subsequent packet to the instructions; and
- drop, by the at least one gateway, the subsequent packet based upon the comparison if the subsequent packet matches the instructions.

9. The system in accordance with claim 2, wherein the computer-executable instructions further cause the system to determine whether the packet was malicious based upon historical packet information from headers of previously transmitted packets.

10. The system in accordance with claim 2, wherein the computer-executable instructions further cause the system to determine that the packet was malicious based upon a comparison of routing information in the enriched second header and source information in the packet.

11. The system in accordance with claim 1, wherein the metadata includes one or more identifiers of one or more of (i) switches through which the packet was routed, and (ii) timestamps.

12. The system in accordance with claim 1, wherein the one or more switches are in communication with each gateway of the plurality of gateways via a virtual tunnel.

13. The system in accordance with claim 12, wherein the computer-executable instructions further cause the system to:
- retrieve, by a switch, the packet through the virtual tunnel to the gateway;
- determine, by the switch, which user computer device the packet originates from; and
- add an identifier for the determined user computer device to the enriched second header.

14. A method for managing a core network, comprising steps of:
- receiving, at one or more switches, a packet from a gateway, wherein the packet includes a first header;
- predicting at least one traffic change to the core network;
- replacing the first header of the packet with an enriched second header including metadata that includes routing information for the packet, including queue information for the one or more switches, to route the packet from the router to a destination for the packet over a first route;
- transmitting, from the one or more switches to a router, the packet including the enriched second header;
- dynamically reconfiguring the first route based on the predicted traffic change;
- replacing, by the router, the enriched second header of the packet with the first header of the packet; and
- transmitting, by the router, the packet including the first header to the destination over the dynamically reconfigured first route.

15. The method in accordance with claim 14, further comprising steps of:
- receiving, at an analytics engine, the enriched second header of the packet;
- analyzing, by the analytics engine, the metadata in the enriched second header of the packet; and
- determining, by the analytics engine, whether the packet was a malicious packet based upon the analysis of the enriched second header.

16. The method in accordance with claim 15, further comprising a step of transmitting the determination that the packet was a malicious packet to a system controller, wherein the system controller is in communication with router and the one or more switches.

17. The method in accordance with claim 16, further comprising steps of:
- generating instructions for one or more of the router and the one or more switches to mitigate subsequent malicious packets; and
- transmitting the instructions to one or more of the router and the one or more switches.

18. The method in accordance with claim 17, further comprising steps of:
- receiving, by the router, a subsequent packet;
- comparing, by the router, the subsequent packet to the instructions; and
- dropping, by the router, the subsequent packet based upon the comparison if the subsequent packet matches the instructions.

19. The method in accordance with claim 17, further comprising steps of:
- receiving, by a switch of the one or more switches, a subsequent packet;
- comparing, by the switch, the subsequent packet to the instructions; and
- dropping, by the switch, the subsequent packet based upon the comparison if the subsequent packet matches the instructions.

20. The method in accordance with claim 17, further comprising steps of:
- determining, by the analytics engine, that a malicious attack is over; and
- transmitting the instructions to one or more of the router and the one or more switches to remove previous instructions.

21. The method in accordance with claim 16, further comprising steps of:
- generating instructions for at least one gateway of a plurality of gateways;
- transmitting the instructions to at least one gateway;
- receiving, by the at least one gateway, a subsequent packet;
- comparing, by the at least one gateway, the subsequent packet to the instructions; and
- dropping, by the at least one gateway, the subsequent packet based upon the comparison if the subsequent packet matches the instructions.

22. The method in accordance with claim 15, further comprising a step of determining whether the packet was malicious based upon historical packet information from headers from previously transmitted packets.

23. The method in accordance with claim 15, further comprising a step of determining that the packet was malicious based upon a comparison of routing information in the enriched second header and source information in the packet.

24. The system in accordance with claim 1, wherein at least one of the one or more switches, the router, and the plurality of gateways are software defined.

\* \* \* \* \*